United States Patent
Wendland et al.

(10) Patent No.: US 11,103,822 B2
(45) Date of Patent: Aug. 31, 2021

(54) AIR FILTERS COMPRISING METAL-CONTAINING POLYMERIC SORBENTS

(71) Applicant: 3M INNOVATIVE PROPERTIES COMPANY, St. Paul, MN (US)

(72) Inventors: Michael S. Wendland, North St. Paul, MN (US); Derek M. Maanum, St. Paul, MN (US); Michael W. Kobe, Lake Elmo, MN (US); Austin D. Groth, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 259 days.

(21) Appl. No.: 16/349,673

(22) PCT Filed: Nov. 13, 2017

(86) PCT No.: PCT/US2017/061258
§ 371 (c)(1),
(2) Date: May 14, 2019

(87) PCT Pub. No.: WO2018/089877
PCT Pub. Date: May 17, 2018

(65) Prior Publication Data
US 2019/0275454 A1      Sep. 12, 2019

Related U.S. Application Data

(60) Provisional application No. 62/421,438, filed on Nov. 14, 2016.

(51) Int. Cl.
B01D 46/00      (2006.01)
B01D 46/24      (2006.01)
(Continued)

(52) U.S. Cl.
CPC ...... B01D 46/0036 (2013.01); A41D 13/1115 (2013.01); A41D 13/1146 (2013.01);
(Continued)

(58) Field of Classification Search
None
See application file for complete search history.

(56) References Cited

U.S. PATENT DOCUMENTS 3,332,890 A      7/1967   Hatch
4,399,009 A      8/1983   Chisholm
(Continued)

FOREIGN PATENT DOCUMENTS

CN      102600718      7/2012
CN      104587980      5/2015
(Continued)

OTHER PUBLICATIONS

Deb, "Crosslinked Styrene-Maleic Acid Copolymer Complexes of Some Transition Metals and their Adsorption Behavior", Polymers for Advanced Technologies, 2005, vol. 16, pp. 681-687.
(Continued)

*Primary Examiner* — Daniel Berns
(74) *Attorney, Agent, or Firm* — Kenneth B. Wood

(57) ABSTRACT

An air filter including a filter support that supports porous, polymeric sorbent particles that comprise a divalent metal impregnated therein.

23 Claims, 4 Drawing Sheets

(51) Int. Cl.
| | |
|---|---|
| B01D 46/52 | (2006.01) |
| B01D 53/04 | (2006.01) |
| B01D 39/08 | (2006.01) |
| B01D 39/16 | (2006.01) |
| B01J 20/26 | (2006.01) |
| B01J 20/32 | (2006.01) |
| A41D 13/11 | (2006.01) |
| A62B 18/02 | (2006.01) |
| A62B 19/00 | (2006.01) |
| A62B 23/02 | (2006.01) |

(52) U.S. Cl.
CPC ............ *A62B 18/025* (2013.01); *A62B 19/00* (2013.01); *A62B 23/02* (2013.01); *A62B 23/025* (2013.01); *B01D 39/083* (2013.01); *B01D 39/1607* (2013.01); *B01D 46/0032* (2013.01); *B01D 46/2411* (2013.01); *B01D 46/2418* (2013.01); *B01D 46/521* (2013.01); *B01D 53/04* (2013.01); *B01J 20/264* (2013.01); *B01J 20/3208* (2013.01); *B01J 20/3236* (2013.01); B01D 2239/0407 (2013.01); B01D 2239/0435 (2013.01); B01D 2239/0618 (2013.01); B01D 2239/0622 (2013.01); B01D 2239/0654 (2013.01); B01D 2253/202 (2013.01); B01D 2257/40 (2013.01); B01D 2257/406 (2013.01); B01D 2258/06 (2013.01); B01D 2259/4508 (2013.01); B01D 2259/4541 (2013.01); B01D 2259/4566 (2013.01)

(56) References Cited

U.S. PATENT DOCUMENTS

| | | | |
|---|---|---|---|
| 4,588,537 A | 5/1986 | Klaase | |
| 4,798,575 A | 1/1989 | Siversson | |
| 4,798,850 A | 1/1989 | Brown | |
| 4,976,677 A | 12/1990 | Siversson | |
| 5,033,465 A | 7/1991 | Braun | |
| 5,344,626 A | 9/1994 | Abler | |
| 5,389,175 A | 2/1995 | Wenz | |
| 5,496,507 A | 3/1996 | Angadjivand | |
| 6,126,707 A | 10/2000 | Pitzen | |
| 6,344,071 B1 | 2/2002 | Smith | |
| 6,391,429 B1 | 5/2002 | Senkus | |
| 6,645,271 B2 | 11/2003 | Seguin | |
| 6,767,460 B1 | 7/2004 | Clough | |
| 6,767,860 B2 | 7/2004 | Hern | |
| 7,235,115 B2 | 6/2007 | Duffy | |
| 7,309,513 B2 | 12/2007 | Brey | |
| 7,503,953 B2 | 3/2009 | Sundet | |
| 7,947,142 B2 | 5/2011 | Fox | |
| 7,955,570 B2 | 6/2011 | Insley | |
| 8,240,484 B2 | 8/2012 | Fox | |
| 8,834,759 B2 | 9/2014 | Lalouch | |
| 2005/0004065 A1 | 1/2005 | Feinstein | |
| 2005/0092176 A1 | 5/2005 | Ding | |
| 2006/0143971 A1* | 7/2006 | Mitchell | A01K 85/01 43/42.06 |
| 2008/0092744 A1 | 4/2008 | Storbo | |
| 2009/0293279 A1 | 12/2009 | Sebastian | |
| 2012/0272829 A1 | 11/2012 | Fox | |
| 2015/0306536 A1 | 10/2015 | Billingsley | |
| 2018/0084781 A1* | 3/2018 | Weiser | A01N 65/24 |

FOREIGN PATENT DOCUMENTS

| | | |
|---|---|---|
| GB | 1066480 | 4/1967 |
| JP | 62227957 | 10/1987 |
| WO | WO 1998-043738 | 10/1998 |
| WO | WO 2015-095110 | 6/2015 |
| WO | WO 2015-095115 | 6/2015 |
| WO | WO 2015-191291 | 12/2015 |
| WO | WO 2016-186858 | 11/2016 |
| WO | WO 2017-106434 | 6/2017 |
| WO | WO 2017-160634 | 9/2017 |
| WO | WO 2018-089870 | 5/2018 |

OTHER PUBLICATIONS

Mathew, "Synthesis of Spherical Copolymer Beads of Styrene-Maleic Anhydride by Aqueous Suspension Polymerization", Journal of Polymer Science: Part A: Polymer Chemistry, 1996, vol. 34, pp. 1605-1607.

Ogawa, "Preparation of Spherical Polymer Beads of Maleic Anhydride-Styrene-Divinylbenzene and Metal Sorption of its Derivatives", Journal of Applied Polymer Science, 1984, vol. 29, pp. 2851-2856.

Okay, "Porous Maleic Anhydride-Styrene-Divinylbenzene Copolymer Beads", Journal of Applied Polymer Science, 1987, vol. 34, pp. 307-317.

Petit, "Interactions of Ammonia with the Surface of Microporous Carbon Impregnated with Transition Metal Chlorides", Journal of Physical Chemistry C, 2007, vol. 111, pp. 12705-12714.

Sharanov, "Ammonia Adsorption by $MgCl_2$, $CaCl_2$ and $BaCl_2$ confined to Porous Alumina: The Fixed Bed Adsorber", Reaction Kinetics and Catalysis Letters, 2005, vol. 85, No. 1, pp. 183-188.

Weston, "Removal of Airborne Toxic Chemicals by Porous Organic Polymers Containing Metal Catecholates", Chemical Communications, The Royal Society of Chemistry, 2013, vol. 49, pp. 2995-2997.

International Search Report for PCT International Application No. PCT/US2017/061258, dated Feb. 28, 2018, 5 pages.

\* cited by examiner

AIR FILTERS COMPRISING METAL-CONTAINING POLYMERIC SORBENTS

BACKGROUND

It is often desired to remove substances such as, e.g., ammonia, from air.

SUMMARY

In broad summary, herein are disclosed air filters comprising filter supports that comprise porous, polymeric sorbent particles that comprise a divalent metal. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

DETAILED DESCRIPTION

Glossary The term "air filter" denotes any apparatus or device in which herein-described polymeric sorbent particles, supported by a filter support, are presented to air, e.g. a stream of moving air, so that an airborne substance can be removed from the air. The term "filter support" denotes any structure that can retain sorbent particles and present them to, e.g., a stream of moving air, but that does not necessarily perform any filtration of microscopic particles from moving air. The term "filter media" denotes a filter support that is itself capable of filtering microscopic particles. A "microscopic" particle is a particle with an average diameter (or equivalent diameter, in the case of non-spherical particles) of less than 100 microns. A "fine" particle is a particle with an average diameter or equivalent diameter of less than 10 microns.

The terms "polymeric sorbent" and "porous polymeric sorbent" are used interchangeably to refer to a polymeric material that is porous and that can sorb airborne materials (e.g., gaseous or vaporous substances; in particular, basic, nitrogen-containing compounds as exemplified by ammonia). By a porous material is meant a material that, whether hydrolyzed or not, exhibits a BET specific surface area (measured in the absence of a divalent metal, e.g. before impregnation of a divalent metal as disclosed herein) of at least about 50 $m^2/g$. Such materials are often characterized based on e.g. the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers.

The term "upstream" is applicable to a circumstance in which a filter is exposed to moving air, and refers to the direction from which moving air encounters a filter; "downstream" refers to the direction in which filtered air exits a filter.

The term "netting" refers to a filter support that is comprised of relatively few layers (five or less, often one) of solid material, e.g. filaments.

The term "fibrous web" refers to a filter support that is comprised of numerous layers (e.g., more than five) of fibers.

The term "meltblown" refers to fibers (and the resulting fibrous webs) that are formed by extruding molten polymer streams into converging high velocity air streams introduced by way of air-blowing orifices located in close proximity to the extrusion orifices. The skilled person will appreciate that meltblown fibers and webs will characteristically exhibit features and signatures (e.g., differences in the orientation of the molecules of the material making up the fibers, as revealed e.g. by optical properties such as birefringence, melting behavior, and so on) by which such fibers and webs can be identified and distinguished from other types of web.

Figure 1:
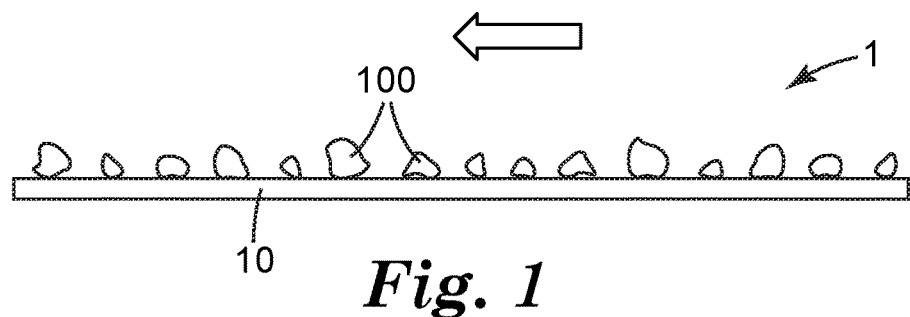
FIG. 1 depicts a portion of an exemplary air filter comprising a filter support comprising sorbent particles as disclosed herein.

Disclosed herein is an air filter 1 as shown in generic representation in FIG. 1. Air filter 1 can be any apparatus or device that exposes herein-disclosed porous polymeric sorbent particles 100 to air, e.g. to a stream of moving air (with the general direction of airflow indicated in exemplary embodiment by the block arrow in FIG. 1 and in other Figures) so that airborne (e.g. gaseous or vaporous) basic, nitrogen-containing materials can be at least partially removed from the air. Air filter 1 is thus distinguished from devices that process liquids, for example ion-exchange membranes and devices.

Air filter 1 comprises at least one filter support 10. A filter support 10 can be any structure that supports sorbent particles 100 in such manner that exposes them to air, while retaining the sorbent particles so that, if the air is moving, the sorbent particles are not dislodged by the moving air. If the air is moving, it may encounter individual sorbent particles while in laminar flow or while in turbulent flow, or may transition between flow regimes in, for example, passing through a collection of sorbent particles. In embodiments of one general type, filter support 10 may take the form of a substrate on which sorbent particles 100 are provided (e.g., are attached to a major surface thereof) and across which e.g. a moving stream of air may traverse, as shown in generic representation in FIG. 1. In some embodiments of this type, filter support 10 may retain sorbent particles 100 e.g. by way of the sorbent particles being attached (e.g., adhesively bonded) to the filter support. In embodiments of another general type, a filter support 10 may retain sorbent particles 100 e.g. by mechanically retaining the sorbent particles within the filter support, as shown in generic representation in FIG. 2. (In other words, in such embodiments the sorbent particles may not necessarily be attached to the filter support, but the filter support can physically block the sorbent particles from being dislodged and removed from the filter support.) In some embodiments, a combination of mechanical retention, and attachment (e.g. bonding), of sorbent particles to the filter support may be employed.

In some embodiments, an air filter 1 may be (e.g., may consist essentially of) a filter support 10 comprising sorbent particles 100 (for example, a freestanding piece of such a filter support could be installed into e.g. a room air purifier).

In other embodiments, an air filter 1 may comprise (in addition to the at least one filter support 10) other layers as desired for any purpose, and/or may additionally comprise any other ancillary components such as e.g. a perimeter frame, one or more reinforcing or stabilizing members, one or more housing pieces, and so on. Various specific exemplary embodiments and arrangements are discussed in detail later herein.

As noted with reference to FIG. 1, in some embodiments a filter support may take the form of a substrate (which substrate may be air impermeable, or air permeable) on a major surface of which sorbent particles 100 are disposed, e.g. attached. Air filters of this type may comprise, for example, a planar substrate bearing sorbent particles attached to a major surface thereof; a hollow tube with sorbent particles attached to an interior surface thereof; or, an array of flow-through channels provided by stacked or nested microstructured substrates (e.g., of the general type described in U.S. Pat. No. 7,955,570 to Insley) with sorbent particles attached to interior surfaces of the flow-through channels; and so on. In some embodiments sorbent particles 100 may be provided at least substantially as a monolayer on a surface of the substrate (e.g. as shown in FIG. 1), except for such occasional stacking as may occur statistically e.g. in any industrial-scale deposition process.

Figure 2:
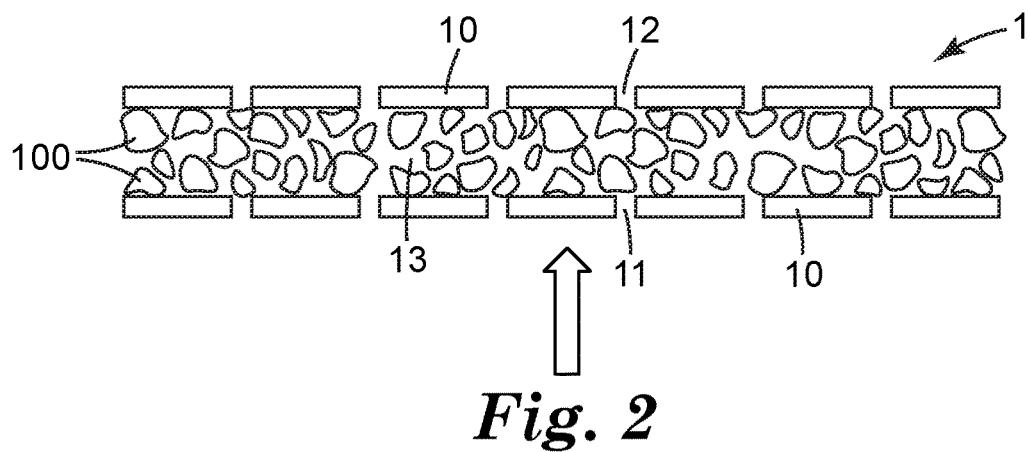
FIG. 2 depicts a portion of another exemplary air filter.

With reference to FIG. 2, the term filter support broadly encompasses any container that is designed to retain sorbent particles 100 therein and that includes at least one air inlet 11 for admitting air to the interior 13 of the container and at least one air outlet 12 to allow treated air to leave the container. Such supports of this general type may include well known filter cartridges in which sorbent particles 100 are retained within a cartridge housing made of e.g. one or more injection molded housing parts. In such filter cartridges, a single air inlet and/or outlet may be provided; or, a number of through-apertures may be provided in the filter cartridge housing to collectively provide an air inlet or outlet. Such through-apertures may be of appropriate size to prevent sorbent particles from passing therethrough; and/or, in some embodiments, an air-permeable protective layer (e.g., a screen or mesh) may be provided to ensure that the sorbent particles are retained within the cartridge housing. In some embodiments a filter support may be impermeable to air (e.g., may contain no through-apertures) in the locations of the support that are proximate to (e.g., that support and retain) sorbent particles, as in the design of FIG. 1. In other embodiments, a filter support may be permeable to air (e.g., may include one or more through-apertures) in locations of the support that are proximate sorbent particles, as in the design of FIG. 2. In some embodiments, a filter support in the form of a container (e.g., a filter cartridge) may be comprised of e.g. one or more injection molded housing parts that are assembled together and that may be air-impermeable except for the air inlet(s) and outlet(s). Such housing parts may be conveniently made of e.g. thermoplastic or thermoset polymers or copolymers chosen from e.g. polyamides, polystyrenes, ABS polymers, polyolefins, and so on. Such containers may also include ancillary components such as e.g. one or more resilient gaskets, latches, splash guards, connectors (e.g. as needed for connecting the cartridge to e.g. a personal respiratory protection device) and so on.

It is emphasized that a filter support 10 that is in the form of a container (as in e.g. FIG. 2) does not necessarily have to take the form of a rigid cartridge made e.g. of injection molded parts. Rather, in some embodiments such a container might take the form of e.g. two air-transmissive "walls" at least one of which is made of a relatively flexible material (e.g., a porous substrate such as a fibrous web, a perforated or microperforated flexible polymer film, and so on) with sorbent particles sandwiched between the two walls. Such a container (which may still be referred to in general as a filter "cartridge") might take the form of e.g. a pouch or sachet.

Still further, the term filter support also broadly encompasses any porous, air-permeable material on which or within which sorbent particles 100 are disposed. (By a porous, air-permeable material is meant a material comprising internal porosity that is interconnected so as to allow airflow through the material, as distinguished from e.g. a closed cell foam.) Such materials might be e.g. open-celled foam materials of any suitable type; or, such a material might be a porous membrane; for example, a phase-inversion membrane, a track-etch membrane (e.g., of the type exemplified by various products available from Whatman under the trade designation NUCLEPORE); or, a stretch-expanded membrane (e.g., of the type exemplified by various products available from W.L Gore and Associates under the trade designation GORE-TEX and available from Celgard corporation under the trade designation CELGARD.) It will be appreciated that filter supports 10 of this general type are not limited to being used e.g. in pairs so as to define a space therebetween as described above. Regardless of the specific mode of use, such a filter support 10 may, in some embodiments, take the form of a sheet-like material that exhibits a major plane and that exhibits a thickness of less than about 8, 5, 3, or 1 mm and that is configured to allow airflow therethrough at least in a direction at least generally perpendicular to the major plane of the sheet-like material.

From the above discussions it will be appreciated that a filter support as disclosed herein widely embraces any material or arrangement, in any form or geometric shape (and whether consisting e.g. of a single entity such as a nonporous substrate, an air-permeable netting, or a porous foam, or made of an assembled combination of parts that collectively form a filter cartridge), that can present sorbent particles to air, e.g. to a stream of moving air. In some embodiments a filter support can be configured so that moving air may flow e.g. at least generally parallel to a major surface of the support that bears sorbent particles (e.g., as in the arrangement of FIG. 1). In some embodiments the moving air may flow at least generally perpendicular to a major surface of the support (e.g., as in the arrangement of FIG. 2). In some embodiments, moving air may flow in directions intermediate between these two extremes. In some embodiments, airflow in both directions and/or in directions intermediate between these two extremes, may occur e.g. in different portions of the air filter.

Figure 3:
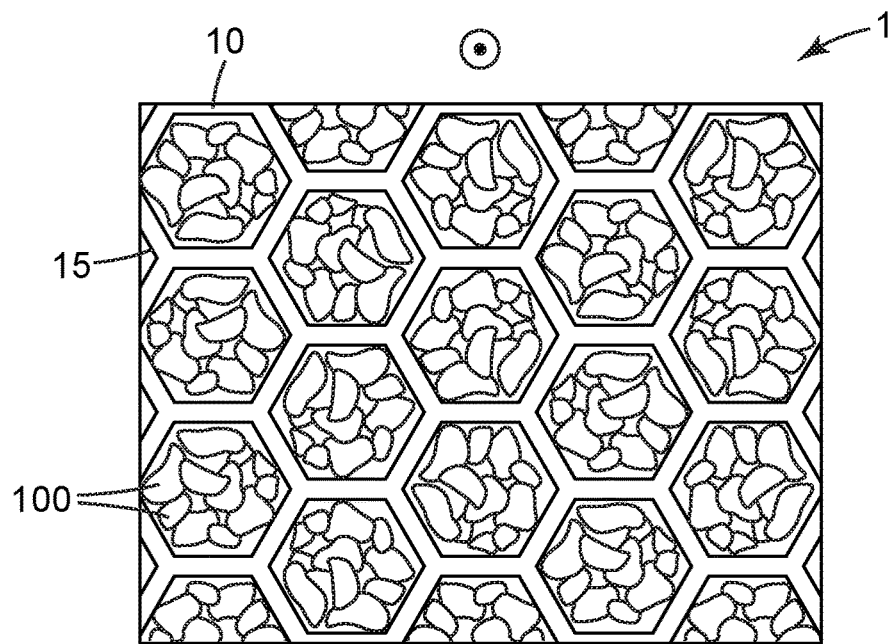
FIG. 3 depicts a portion of another exemplary air filter.

In embodiments of the general type illustrated in exemplary manner in FIG. 3, an air filter 1 may comprise a filter support 10 that is in the form of a "honeycomb" 15. The skilled person will recognize a honeycomb as being a flow-through support structure that comprises numerous macroscopic through-apertures that allow airflow therethrough, the apertures being separated from each other by partitions (walls) of the honeycomb structure. (While the term honeycomb is used here for convenience, the skilled person will appreciate that the structure may be of any geometry (e.g., with apertures that are square, triangular, round, etc.) and may exhibit a somewhat irregular appearance rather than being limited strictly to the regular hexagonal geometry shown in the exemplary design of FIG. 3.) Often, such honeycombs may comprise through-apertures with rather large diameter or equivalent diameter (e.g. from 10-15 mm), in contrast to the above-described stacked microstructured substrates, which may often comprise flow-through channels with a diameter or equivalent diameter of only e.g. a few mm or smaller. The walls of the honeycomb may be made of any suitable material, e.g. molded or extruded plastic, paperboard or cardboard, metal, and so on.

In some embodiments, sorbent particles may be attached to interior walls that define the apertures of the honeycomb. However, in some embodiments, it may be convenient to partially, or at least substantially, fill the apertures of the honeycomb with sorbent particles (to the extent permitted by packing behavior, depending e.g. on the average size, size distribution, and shape of the sorbent particles) as in FIG. 3. In such a case the honeycomb may be provided with upstream and downstream air-permeable substrates (e.g., suitable meshes or screens) that allow airflow to enter and exit the through-apertures of the honeycomb and yet retain the sorbent particles within the through-apertures of the honeycomb. (The direction of airflow in the exemplary honeycomb of FIG. 3 is out-of-plane as indicated by the circle/dot arrow.) In some embodiments, the sorbent particles may be packed loosely within the apertures e.g. so that the particles are able to move or shift slightly. In other embodiments, the sorbent particles may be bonded to each other (e.g., by use of an adhesive, a heat-activated binder, etc., in amounts sufficient to bond particles to each other at contact points but not in amounts that would unacceptably occlude the particles so as to impact their ability to capture airborne substances) e.g. so as to minimize shifting or settling of the particles within the apertures. In other words, in some embodiments (not necessarily limited to use in honeycombs) sorbent particles 100 may be provided in the form of a monolithic, air-permeable block (of any desired size and shape) collectively provided by an aggregation of particles that are bonded together, rather than being provided as individual particles. Exemplary methods of making such monolithic structures (which again, may have any suitable size and shape for incorporation into any desired air filter, for example, for fitting into a container such as e.g. a cartridge or canister, or for forming a layer of e.g. a respirator) are discussed e.g. in U.S. Pat. No. 5,033,465 to Braun. Methods of bonding sorbent particles together to make, in particular, a structure that is at least semi-flexible (and thus may be particularly suited for use in e.g. a flexible respirator mask), are discussed e.g. in U.S. Pat. No. 6,391,429 to Senkus.

The skilled person will appreciate that there may not necessarily be a firm dividing line between some of the above-mentioned embodiments (for example, between sorbent particles being provided within hollow tubes, versus being provided within channels defined by a stacked microstructured substrate, versus being provided within apertures of a honeycomb). All such designs and arrangements, and combinations thereof, are encompassed within the general concept of an air filter that comprises one or more filter supports as disclosed herein. It is noted in particular that in some embodiments, an air filter 1 as disclosed herein can comprise sorbent particles that are partially filled, or at least substantially filled, into the interior of any suitable container (of any geometric form and made of any material, whether e.g. rigid or at least semi-flexible) so as to form e.g. a packed bed. In some embodiments, such a container might take the form of a hollow tube, e.g. a tube resembling the gas-detection tubes often referred to as Drager tubes.

Figure 4:
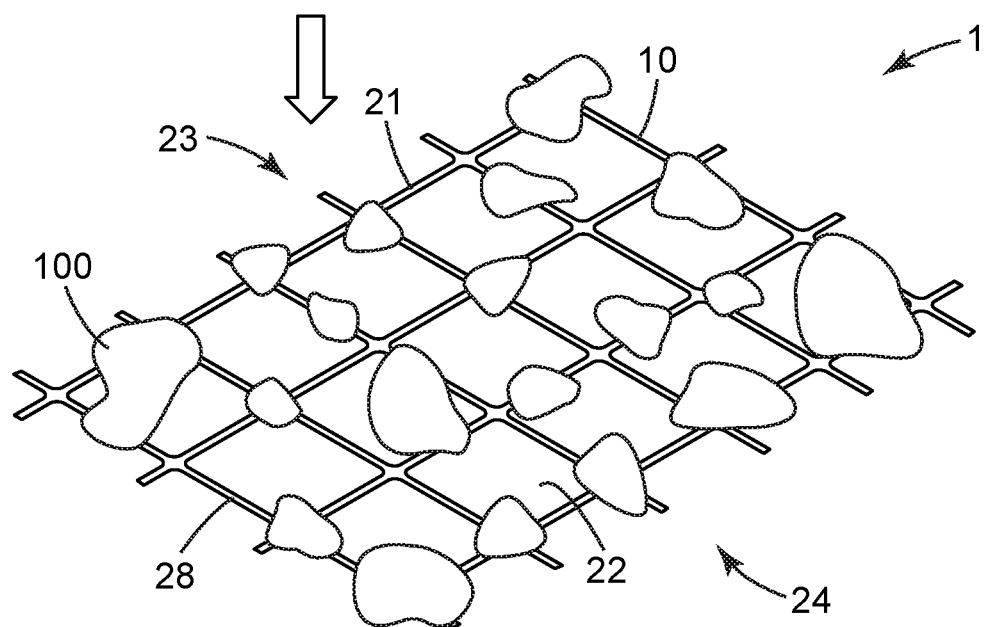
FIG. 4 depicts a portion of another exemplary air filter.

In some embodiments, a filter support 10 may comprise a thin, sheet-like material with numerous through-apertures 22 that allow airflow therethrough, as shown in exemplary, generic representation in FIG. 4. In various embodiments, filter support 10 may take the form of any suitable netting, mesh, screen, scrim, woven or knitted material, meltspun material, microperforated film, and so on. The term netting will be used herein for convenience in describing any such material, that is comprised of relatively few layers (five or less; often, a single layer as in FIG. 4) of filaments (or, in general, layers of solid material in between through-openings). Often, such filaments (or solid portions of a sheet-like filter support material, e.g. a microperforated film) are relatively large (for example, 0.1, 0.2, or 0.5 mm or more) in diameter or the equivalent thereof. Such a netting may be comprised of any suitable material, e.g. an organic polymer, an inorganic material (e.g., glass or ceramic), or a metal or metal alloy.

In such embodiments airflow may occur primarily through the through-apertures 22 between the solid portions 21 (e.g. filaments) of the netting so that the airflow is oriented at least generally perpendicular to the support; however, if desired the airflow could occur at least generally parallel to the netting. In the case of generally perpendicular airflow that passes through the netting, it may be convenient that the sorbent particles are positioned on the upstream side 23 of the netting (as in FIG. 4). However, if desired the sorbent particles may be positioned on the downstream side 24 of the netting. In particular embodiments, sorbent particles may be positioned on both sides of the netting. In some embodiments, a netting (or, in general, any sufficiently air-permeable substrate) comprising sorbent particles may be used "open-face" as in the illustrative embodiments of FIGS. 1 and 4. In other embodiments, a secondary retaining layer that is sufficiently air-permeable (e.g., a second layer of netting, or a layer of a fibrous web, a microporous membrane, or the like) may be positioned atop the sorbent particles to assist in retaining the sorbent particles in position. (In other words, the sorbent particles may be sandwiched between the netting and a secondary retaining layer.)

In many embodiments, sorbent particles 100 may be bonded, e.g. adhesively bonded, to the solid material (e.g., filaments) of the netting, e.g. by way of an adhesive, e.g. a pressure-sensitive adhesive, a hot-melt adhesive, an epoxy adhesive, and the like 28 that is provided on at least one major surface of one side of the netting. Sorbent particles may each be bonded e.g. to a single filament, or may be bonded to multiple filaments. The average diameter of the filaments, and the average size of the through-apertures between the filaments, can be chosen in view of the average size of the sorbent particles if desired. In various embodiments, such nettings may exhibit an average filament diameter in the range of e.g. 0.2 mm to about 2.0 mm. In various embodiments, the openings of the netting may range from e.g. about 0.5 mm in shortest dimension to about 5 mm in longest dimension, and may be chosen in view of the particle size of the sorbent. By way of specific example, a netting with openings in a range of about 1-2 mm may be well suited for use with a sorbent that exhibits a particle size in the range of 8×20 mesh. Exemplary nettings that might be suitable for use as disclosed herein include various products available (e.g. under the trade designations DELNET) from Delstar Technologies; for example, the products available under the trade designations KX215P, R0412-10PR, RB0404-10P, N02014-90PP, RB0404-28P, N03011-90PP, and TK16-SBSH.

In particular embodiments, a suitable pressure sensitive adhesive 28 may be provided on a major surface of the netting (in other words, the pressure-sensitive adhesive may be provided on surfaces of the filaments that collectively provide that major surface of the netting). This may be done e.g. by coating a pressure-sensitive adhesive precursor onto the netting and then transforming the precursor into a pressure-sensitive adhesive. The precursor may be e.g. a solution in an organic solvent(s), an emulsion, a hot-melt composition, and so on. Such a precursor may be transformed e.g. by drying to remove solvent and/or water, by cooling to solidify a hot-melt composition, and so on. The deposition and transformation should be done in such manner as to avoid unacceptably filling or clogging the through-apertures of the netting (unless the airflow is not to pass through the netting in ordinary use of the filter).

It will be appreciated that in some embodiments particles that are disposed on a netting may be attached to the netting primarily due to e.g. adhesive bonding (rather than through e.g. mechanical entanglement). In some embodiments, the sorbent particles may be present on a filter support at least substantially in the form of a monolayer. In other embodiments sorbent particles may be present in multiple layers (made e.g. by adhesively bonding a first layer of sorbent particles to a major surface of a netting, applying additional adhesive atop the first layer of sorbent particles, depositing more sorbent particles, and repeating the process to build up a collection of sorbent particles of any desired depth).

Figure 5:
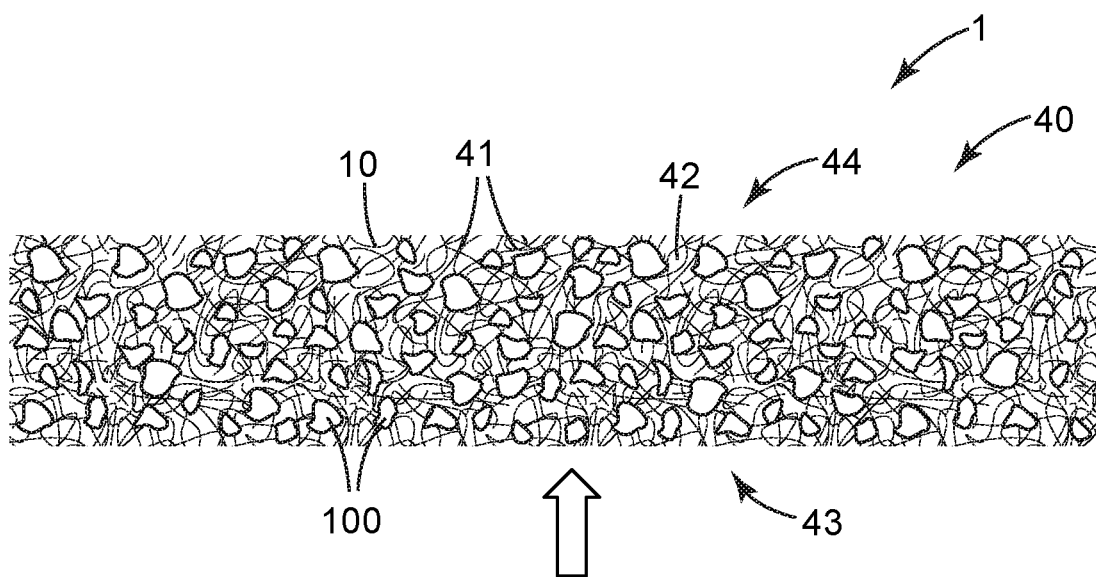
FIG. 5 depicts a portion of another exemplary air filter.

In some embodiments a filter support 10 may comprise a sheet-like material comprised of numerous fibers, often entangled with each other and often present in numerous "layers" (e.g., more than five layers) as shown in exemplary embodiment in FIG. 5. The term fibrous web will be used herein for convenience in describing any such material. It will be appreciated of course that due to the random nature of many such fibrous webs, the fibers may not necessarily be, and often will not be, present in discrete layers (e.g., layers that can be peeled apart from each other); however, it will be readily apparent if e.g. five or more separate fibers or sections of fibers are encountered in traversing the thickness (depth) of such a web from a first major surface 43 thereof to a second major surface 44 thereof (as in FIG. 5). Any material exhibiting such a fiber arrangement falls under the definition of a fibrous web as used herein.

Often, such fibers may be relatively small (for example, less than 100, 80, 60, 40, 20, 10, 5, or 2 µm) in diameter or the equivalent thereof. Mixtures of fibers of various diameters may of course be used. Such a fibrous web may be any suitable type of web, e.g. a nonwoven web in which the fibers are relatively randomly arranged (e.g. except for such partial amounts of fiber alignment as may occur with e.g. carded webs and with certain types of fiber-deposition methods). Alternatively, such a fibrous web may be comprised of a knitted or woven web in which the fibers are provided in a sufficient number of layers. Typically, air will flow through the web by passing through interstitial spaces between the numerous fibers of the web; often, such airflow is oriented at least generally perpendicular to a major plane of the fibrous web as in FIG. 5. However, if desired the airflow could occur at least generally parallel to a major plane of the fibrous web. The fibers of such a fibrous web can be bonded to each other (so that the web has sufficient mechanical integrity to be processed and handled) in any suitable manner. Such bonding methods might be chosen from e.g. hydroentangling, needle-punching, calendering, and the like. In some embodiments, the fibers may be autogenously bonded to each other, meaning that the fibers are bonded at an elevated temperature as obtained in an oven or with a so-called through-air bonder without application of solid contact pressure such as in point-bonding or calendering. In particular embodiments, the fibers may be bonded using autogenous bonding methods of the general type described in U.S. Pat. No. 7,947,142 to Fox (in which a stream of heated air is passed through the collection of fibers followed by forceful quenching). Or, one or more binders (whether in the form of fibers, solid particles, a water-born emulsion, and so on) may be added and then activated (e.g. by heating) to bond the fibers together to form the final web. Any such bonding operation (whether achieved primarily mechanically by entanglement of fibers, or by use of a melt-bonding of fibers and/or by use of an added binder) may additionally serve to bind sorbent particles into or onto the web, as noted below.

In some embodiments sorbent particles 100 may be deposited primarily, or exclusively, on a major surface (e.g., a major upstream surface) of the fibrous web, in somewhat similar manner to the arrangement of particles on the netting of FIG. 4. In some embodiments at least some of the sorbent particles may penetrate at least partly into the interior of the fibrous web. (This is in contrast to the situation with a netting provided by e.g. a monolayer of filaments as in FIG. 4, in which case the support exhibits little or no "interior" into which sorbent particles could penetrate.) In some such embodiments the sorbent particles may be found primarily in the region of the fibrous web proximate the major surface onto or into which the sorbent particles were deposited. In many embodiments, however, it may be desirable to provide that sorbent particles 100 are distributed widely throughout the thickness of the fibrous web (as shown in exemplary embodiment in FIG. 5), as opposed to the particles being e.g. deposited onto one surface so that they either remain on the surface or only penetrate a short distance into the interior of the fibrous web. Suitable methods of forming fibrous webs with sorbent particles distributed widely (e.g., randomly) throughout the interior of the web are discussed later herein.

In particular embodiments, a fibrous web filter support may be a nonwoven web. By definition, nonwoven fibrous webs do not encompass e.g. woven or knitted webs or microperforated films. Such a web can be made by any suitable method and can be of any suitable type. For example, such a nonwoven web might be: a carded web; a wet-laid web (made e.g. by papermaking processes); a dry-laid web made e.g. by a conventional airlaying process such as the well-known Rando-Webber process, or made by a specialized process such as the gravity-laying process described in U.S. Pat. No. 8,834,759 to Lalouch; or, a meltspun web (e.g. a spunbonded web, a spunlaced web, and so on). (It will be appreciated that certain e.g. spunbonded or spunlaced webs may qualify as nettings rather than as fibrous webs, depending e.g. on the depth of fibers that are laid down.) In particular embodiments, the nonwoven web may be a meltblown web, which process and resulting web will be well known to the skilled person. Any combination of layers of these various materials (including combination with layers that are not nonwoven webs) can be used. The fibers may be made of any suitable material, e.g. thermoplastic organic fibers (such as e.g. polyolefin fibers, cellulosic fibers, polyester fibers, nylon fibers, etc.), inorganic fibers (such as e.g. fiberglass or ceramic fibers), metal fibers, and so on.

Sorbent particles 100 may be provided on and/or within a porous material, e.g. a fibrous web such as a nonwoven web to form a herein-disclosed filter support of an air filter, by any suitable method. In some embodiments, the sorbent particles may be deposited on or into a pre-existing fibrous web. For example, in some embodiments a nonwoven web may comprise one or more binding components such as bondable fibers and/or a non-fibrous binder (a non-fibrous binder may take the form of e.g. particles, an emulsion or latex, and so on). The web may be heated to a temperature to soften and activate such a binding component(s), and the sorbent particles may then be deposited onto a major surface of the nonwoven web to be bonded thereto. It will be appreciated that many such processes may preferentially result in sorbent particles being present on or proximate a major surface of the nonwoven web onto which the sorbent particles were deposited. If desired, such a process may be repeated multiple times with the successive layers being bonded together to form a multilayer product comprising sorbent particles therein.

In other embodiments, the sorbent particles may be introduced into a nonwoven web during the process of making the web. For example, if a nonwoven web is made by meltblowing, it may be convenient to introduce the sorbent particles into the flowing stream of incipient fibers (the term incipient fibers refers to molten streams that may or may not have begun to solidify into fibers, or finished solidifying into fibers). General methods of performing such operations are disclosed in US Patent Application Publication No. 20120272829 to Fox, which is incorporated by reference herein. The incipient fibers may be deposited (e.g., onto a temporary collection surface or onto a secondary web that remains as part of the filter support) in a condition in which the incipient fibers are at least slightly sticky (bondable). Such arrangements can provide that at least some of the fibers of the meltblown nonwoven web are bonded (e.g., melt-bonded) to the sorbent particles. In this manner a meltblown web can be made comprising sorbent particles therein, in a single operation.

Of course, it is also possible to use other methods to introduce sorbent particles into a mixture of fibers prior to the fibers being collected as a web. For example, sorbent particles may be mixed with fibers that are input to a web-formation process (e.g., the above-mentioned gravity-laying web-formation process), to form a collected mass of fibers comprising sorbent particles therein. Such an approach can include adding binder (whether in the form of fibers, or as non-fibrous binders such as particles, an emulsion, etc.) to the input materials so that the collected mass of fibers can be heated to bind the fibers together to form a web and/or to bond the sorbent particles into the web. Whatever approaches is/are used, the primary mechanism by which sorbent particles are bound into or onto the fibrous web can be the same or different from the binding mechanism that is used to bind the fibers together to form the web.

With particular regard to a meltblown fibrous web, a variety of fiber-forming polymeric materials may be used to form such fibers. At least some fibers may be made of a material that exhibits sufficient bonding (adhesive) properties under the conditions (e.g., melt-blowing conditions) used in making the nonwoven web. Examples include thermoplastics such as polyurethane elastomeric materials, polybutylene elastomeric materials, polyester elastomeric materials, polyether block copolyamide elastomeric materials, polyolefin-based elastomeric materials (e.g., those available under the trade designation VERSIFY from Dow), and elastomeric styrenic block copolymers (e.g., those available under the trade designations KRATON from Kraton Polymers, Houston, Tex.). Multicomponent fibers (e.g., core-sheath fibers, splittable or side-by-side bicomponent fibers and so-called "islands in the sea" fibers) in which at least one exposed surface of the fibers (e.g., the sheath portion of a core-sheath fiber) exhibits sufficient adhesive properties, may also be used.

In some embodiments, fibers that are able to bond to sorbent particles 100 may be the only fibers present in the meltblown web. In other embodiments, other fibers (e.g. that do not participate to any significant extent in bonding the sorbent particles) may be present e.g. as long as sufficient bondable fibers are present. In various embodiments, bondable fibers may comprise at least about 2 weight percent, at least about 4 weight percent, and at least about 6 weight percent of the meltblown nonwoven web. In further embodiments, bondable fibers may comprise no greater than about 20 weight percent, no greater than about 17 weight percent, and no greater than about 15 weight percent of the meltblown nonwoven web. Any nonbondable fibers that are present in the web may be of any suitable type and composition; for example, any of the well known polyolefinic fibers (e.g. polypropylene, polyethylene, and the like) may be used, as may any of the well known polyester fibers. In at least some embodiments, the nonwoven web is essentially free of any added binder of any kind. That is, in such cases essentially all binding of the sorbent particles (to retain them in the meltblown nonwoven web) is performed by the bondable fibers. Such embodiments thus exclude the presence of binder in such forms as particles or powders, liquids such as latexes, emulsions, suspensions, or solutions, and so on.

It will be appreciated that the above discussions have concerned methods in which bonding of fibers to the sorbent particles is at least partially used to retain the particles within the nonwoven web. Physical entanglement of the sorbent particles within the fibers can also assist in retaining the sorbent particles within the nonwoven web. In some embodiments, a secondary air-permeable layer (e.g. a scrim or facing) can be applied to (e.g., bonded to) one or more major surfaces of the nonwoven web to minimize the chances of any of the sorbent particles becoming dislodged therefrom. In fact, in some embodiments it may be convenient to deposit the incipient fibers that will form a meltblown nonwoven web (along with the sorbent particles that are merged into the stream of incipient fibers), onto a major surface of a secondary web (e.g., scrim or facing) so that the meltblown web is bonded to the secondary web in the act of making the meltblown web.

In some embodiments, air filter 1 may comprise at least one filter media 40. A filter media is a filter support 10 that can retain sorbent particles 100 and expose them to air; beyond this, a filter media is a particular type of filter support that is capable of filtering significant amounts of microscopic particles (i.e., particles of average diameter of 100 microns or less) from moving air. A filter media 40 may comprise any material that can provide an air-permeable network structure into or onto which sorbent particles can be incorporated so as to present the sorbent particles to an airstream that is moving through the air-permeable network structure, and that furthermore is itself capable of filtering microscopic particles. Such a filter media might be e.g. a nonwoven web that is a meltblown and/or charged web.

As noted, a filter media is able to capture a significant amount of microscopic particles (with diameter 100 µm or less). In specific embodiments, a filter media may be able to capture a significant amount of fine particles in the range of e.g. 10 µm or less, or even in the range of 2.5 µm or less. In particular embodiments, the filter media may be capable of performing HEPA filtration. It will be appreciated that use of electret (charged) materials as described below, may substantially enhance the ability to perform e.g. fine-particle filtration or HEPA-filtration. In various embodiments, a filter media 40 may exhibit a Percent Penetration (specified herein as using Dioctyl Phthalate as a challenge material, and tested using methods described in U.S. Pat. No. 7,947,142 to Fox)

of less than about 80, 70, 60, 50, 40, 30, 20, 10, or 5. All processes (e.g., fiber-bonding, charging, pleating, and the like), parameters and characterizations that are described herein with respect to filter supports in general, may be applied in particular to filter media.

In some embodiments, a nonwoven web (e.g., a meltblown nonwoven web) for use as a filter support (or, in particular, as a filter media) may include electrostatically charged fibers. Charging of such fibers may be done by any suitable method, for example, by imparting electric charge to the nonwoven web using water as taught in U.S. Pat. No. 5,496,507 to Angadjivand, or as taught in U.S. Patent Publication No. 2009/0293279 to Sebastian. Nonwoven electret webs may also be produced by corona charging as described in U.S. Pat. No. 4,588,537 to Klaase, or using mechanical approaches to impart an electric charge to fibers as described in U.S. Pat. No. 4,798,850 to Brown. Any combination of such approaches may be used. Fibers may be charged before being formed into the nonwoven web, or after the nonwoven web is formed. (In any case, any such charging may be conveniently performed before the air filter media is pleated, if it is to be pleated.) In the case that an air filter is to include a particle-filtration layer that is a different layer from filter support 10 (as described below), such a particle-filtration layer may be charged if desired, e.g. by any of the above approaches.

If the filter support (whether free-standing, or part of a multilayer assembly) is to be pleated, pleat formation and pleat spacing may be performed using any suitable technique including those disclosed in U.S. Pat. No. 4,798,575 to Siversson, U.S. Pat. No. 4,976,677 to Siversson, and U.S. Pat. No. 5,389,175 to Wenz. Pleating procedures that may be useful are also described e.g. in U.S. Pat. No. 7,235,115 to Duffy. (It will be appreciated, however, that in at least some embodiments the use of score-pleating may be avoided since the scoring process may serve to crush at least some of the sorbent particles.) In various embodiments, the pleated air filter support may include about 0.5 to about 5 pleats per 2.5 centimeters. More specifically, the pleat spacing may be e.g. from about 6, 8, 10, or 12 mm, to about 50, 40, 30, 20, or 15 mm. In various embodiments, the pleat height may be e.g. from about 15, 20, 25, or 30 mm, to about 100, 80, 60 or 40 mm.

An air filter 1 may comprise a filter support 10 (which by definition supports at least some polymeric sorbent particles 100) that consists of a single layer; or, multiple layers of filter support 10 (e.g., each layer including at least some polymeric sorbent particles 100) may be present in an air filter 1. Particularly if the filter support(s) 10 is not itself an air filter media as defined herein, the air filter 1 may include (in addition to the at least one filter support layer 10) one or more particle-filtration layers (e.g., capable of filtration of microscopic particles, fine particles, and/or HEPA filtration) that do not include polymeric sorbent particles 100. Such a particle filtration layer may be electrostatically charged if desired, and in various embodiments may exhibit a Percent Penetration of less than about 80, 70, 60, 50, 40, 30, 20, 10, or 5. (The term particle broadly encompasses e.g. aerosols, dust, mist, fumes, smoke, mold, bacteria, spores, pollen, and so on.) In particular embodiments, such a particle-filtration layer may be a high-loft spunbonded nonwoven web e.g. of the type described in U.S. Pat. No. 8,240,484 to Fox, and comprising a solidity of from less than 8%, to about 4%, and that is comprised of meltspun fibers that are substantially free of crimped fibers, gap-formed fibers and bicomponent fibers.

Regardless of whether or not any particle-filtration layers are present, an air filter 1 may comprise (in addition to at least one filter support layer 10 and any optional particle-filtration layers) one or more secondary layers (e.g., scrims, nettings, covers, and so on), e.g. to serve as a cover layer, a coarse prefilter, a carrier layer, a skin-contacting layer, to provide mechanical support or stiffness, and so on. That is, in general, and without regard to the particular type, configuration or construction of a filter support layer 10, such a filter support layer may be provided as one layer of a multilayer air-permeable assembly (stack) that can collectively provide an air filter 1. Any such multilayer stack may of course be pleated, framed, and so on, as described herein.

The herein-disclosed sorbent particles (whether e.g. dispersed within a nonwoven fibrous web, disposed on a surface of a substrate, filled into a receptacle(s) e.g. to form a packed bed, etc.), may be used in combination with any secondary sorbent particles, configured to capture any desired component present in air (e.g. a noxious gas/vapor). In some embodiments, such secondary sorbent particles may be present in a separate layer that is e.g. upstream or downstream of polymeric sorbent particles 100. In other embodiments, sorbent particles 100 and any desired secondary sorbent particle(s) may be mixed together. Secondary sorbent particles (whether used in a separate layer or as a commingled mixture with polymeric sorbent particles 100) may be chosen from, for example, activated carbon, alumina and other metal oxides, clay, hopcalite, ion exchange resins, molecular sieves and zeolites, silica, sodium bicarbonate, metal-organic frameworks (MOFs), and so on including combinations of any of these materials. In some embodiments, secondary sorbent particles (e.g. activated carbon) may be impregnated sorbent particles that are suitably impregnated with e.g. any desired metal salt or compound. Various particles that may be suitable for use as secondary sorbent particles are described in detail in U. S. Patent Application Publication No. 2015/0306536 to Billingsley; and, in U.S. Provisional Application No. 62/269,613, filed 18 Dec. 2015 and entitled POLYMERIC SORBENTS FOR ALDEHYDES; both of which are incorporated by reference in their entirety herein. Any combination of any of such particles may be used. Porous polymeric sorbent particles 100 and one or more sets of secondary sorbent particles may be used in any weight ratio. In particular, the term "secondary" is used for convenience of description and does not require that any secondary sorbent particles must be present, for example, in a lower amount than the porous polymeric sorbent particles 100. Furthermore, the disclosed sorbent particles 100 may be mixed e.g. with particles, granules or the like, that are not porous and/or do not perform any sorbing function (such particles may e.g. perform a spacing or separating function).

In some embodiments, an air filter 1 comprising sorbent particles 100 as disclosed herein, may be used in combination with a secondary air filter that is provided separately from air filter 1. In some embodiments, an air filter 1 and a secondary air filter may be separately installed into different areas of an air-handling apparatus. (For example, an air filter 1 and a secondary air filter may each be a framed air filter and may each be separately inserted e.g. into a room air purifier.) Alternatively, an air filter 1 and a secondary air filter may be assembled together (and e.g. attached to each other) before being installed into e.g. an air-handling apparatus. Air filter 1 can be placed e.g. upstream or downstream of the secondary air filter (if air filter 1 is upstream, it may serve e.g. as a prefilter for the secondary filter). In some exemplary embodiments, a secondary air filter may be configured e.g. to capture fine particles, and may exhibit a Percent Penetration of e.g. less than about 80, 70, 60, 50, 40, 30, 20, 10, or 5.

Figure 6:
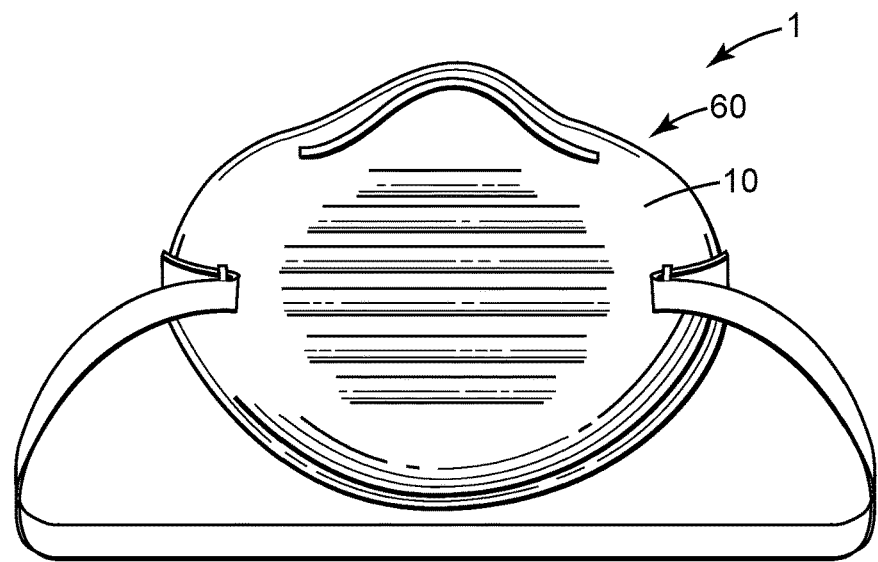
FIG. 6 depicts an exemplary respirator comprising a filter support comprising sorbent particles as disclosed herein.
Figure 7:
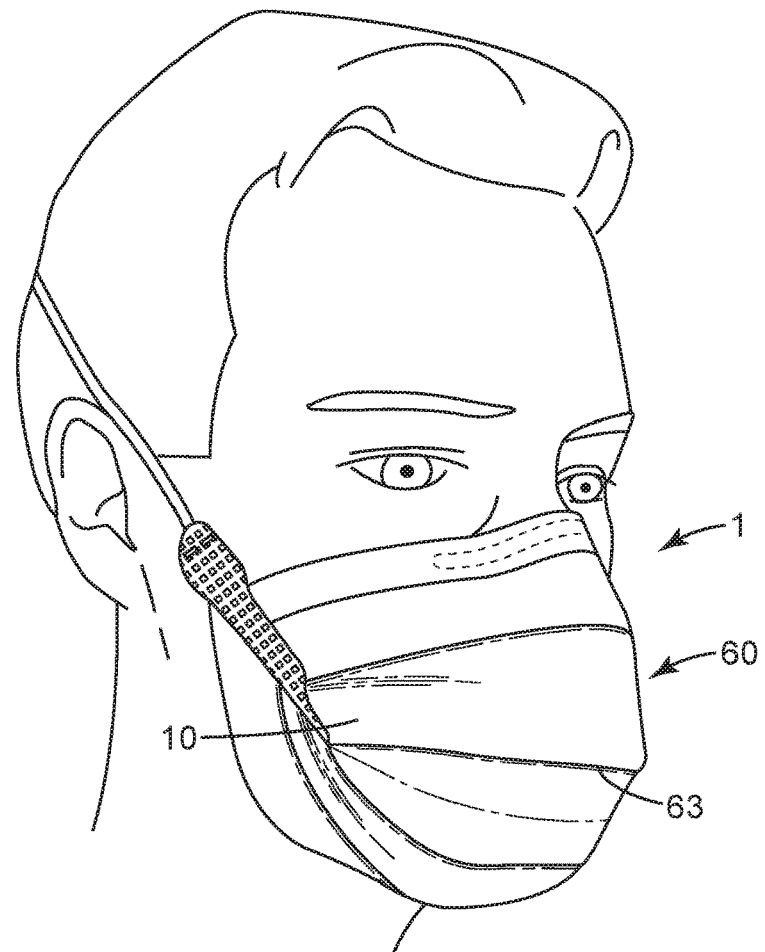
FIG. 7 discloses another exemplary respirator.

A filter support 10 comprising sorbent particles 100 as disclosed herein may be used in any kind of air filter 1, configured for any suitable end use. By way of specific examples, filter support 10 may find use in e.g. an air filter that is, or is part of, a personal respiratory protection device. It has already been noted that filter support 10 may take the form of a filter cartridge that can be fluidly coupled to a mask body to provide a personal respiratory protection device (e.g., the filter cartridge being disposable and the mask body being a piece that is shaped to fit a user's face and that is retained and a replacement filter cartridge attached thereto at an appropriate time). In other embodiments, filter support 10 may be incorporated into a "filtering face-piece" respirator mask 60. In products of this general type, the mask body itself provides the filtering function. That is, unlike respirators that use mask bodies in conjunction with attachable filter cartridges or the like, filtering face-piece respirators are designed to have the filtration layer(s) present over much or essentially all of the entire mask body so that there is no need for installing or replacing a filter cartridge. (That is, in a filtering face-piece respirator the mask body itself performs the filtering function rather than relying on one or more cartridges attached thereto.) Filtering face-piece respirators 60 often come in one of two configurations: molded (e.g. shaped, into a generally cup-shape so as to fit on a user's face) as shown in exemplary representation in FIG. 6, and flat-fold, that can be supplied in a flat or nearly-flat condition and can then be unfolded and expanded to fit on a user's face, as shown in exemplary representation in FIG. 7.

Such a respirator mask (whether e.g. a flat-fold or molded respirator) 60 may comprise any desired ancillary layers (e.g., one or more cover layers, stiffening layers, pre-filter layers, and the like) and components (e.g. one or more exhaust valves, attachment bands or strings, nose-pieces, and so on). If used in a flat-fold respirator mask, filter support 10 may often take the form of a relatively flexible layer (e.g. with one or more preferential folding lines 63 provided to make the material more easily foldable). If filter support 10 is to be used in a molded respirator mask (that is not designed to be foldable), filter support 10 may be e.g. a semi-rigid material (noting however that since in many molded, cup-shaped respirator masks much of the stiffness may be provided by a stiffening layer that is separate from the filtering layer(s), it may not be strictly necessary that filter support 10 be rigid, or even semi-rigid, for use in such a product).

It will be appreciated that the above-described uses fall primarily into the category of so-called "negative-pressure" respirators; that is, products in which the motive power for moving air is the breathing of a user rather than a separately provided motorized fan. Such negative-pressure respirators are often configured as e.g. full-face respirators, half-face respirators, and hoods (e.g., escape hoods, smoke hoods, and the like). All such products are encompassed by the term negative-pressure respirator as used herein, and filter support 10 may be used with any such product.

In other embodiments, filter support 10 may be used in a respirator in which the motive power for moving air is a motorized fan or blower. Such products may include e.g. a PAPR (powered air purifying respirator). In such products, filter support 10 (and, in general, air filter 1) may be located proximate the user's face or head; or, it may be located remotely (e.g., positioned in a receptacle of a belt-worn housing).

Figure 8:
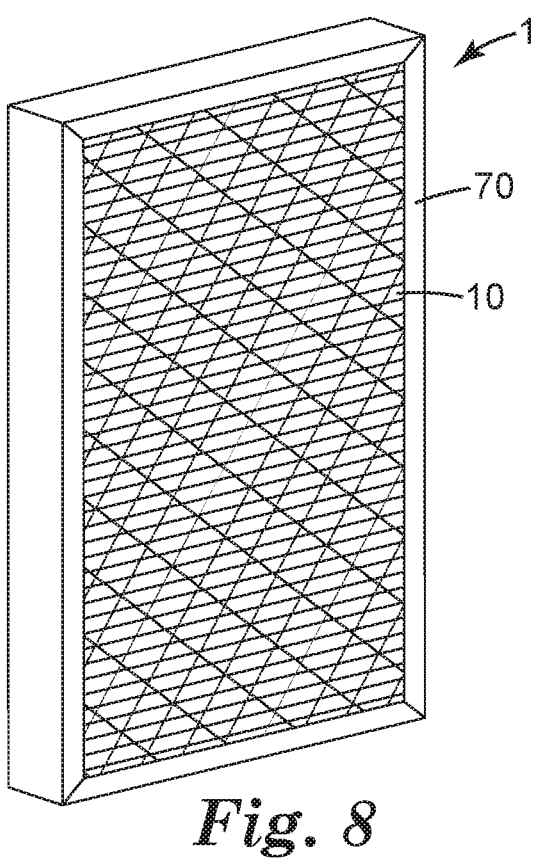
FIG. 8 discloses a framed, pleated air filter comprising a filter support comprising sorbent particles as disclosed herein.

In some embodiments as shown in exemplary embodiment in FIG. 8, a filter support 10 (e.g., whether pleated or not, and whether or not including any other layers such as particle-filtration layers, etc.) may be incorporated into an air filter 1 that includes a perimeter frame 70 (e.g. a rigidifying or supporting frame), which may be e.g. arranged around a perimeter edge region of the filter support. Suitable materials for the frame include chip board, or paperboard, synthetic plastic materials and metal. Suitable frame constructions might be chosen from e.g. the "pinch" frame construction illustrated in FIGS. 1-4 of U.S. Pat. No. 6,126,707 to Pitzen, the "box" frame construction illustrated in FIGS. 5 and 6 of the '707 patent, the hybrid frame construction illustrated in FIGS. 7-11 of the '707 patent, any of the frame constructions disclosed in U.S. Pat. No. 7,503,953 to Sundet, and any of the frame constructions disclosed in U.S. Pat. No. 7,235,115 to Duffy. Any such frame may be attached to the filter support by any suitable method, e.g. hot-melt bonding, room-temperature glue, and so on.

An air filter 1 (whether framed or not) comprising filter support 10 may be advantageously used to filter moving air in any suitable powered air-handling system, e.g. in HVAC systems (e.g., in forced-air heating, cooling, and/or heating/cooling systems often used in residences, office buildings, retail establishments, and so on). Such filters may also find use in room air purifiers, motor vehicles (such as in e.g. cabin air filtration of automobiles), clean rooms, operating rooms, and the like. In some embodiments, air filter 1 (e.g., as part of a filter cartridge) may be inserted into an air pathway of a powered air-purifying respirator, as noted above. While in any or all such uses it may not be necessary that air filter 1 be a framed air filter, in many such uses it may be advantageous for air filter 1 to be a framed air filter.

The above discussions all relate to methods of providing porous polymeric sorbent particles 100 on a suitable filter support 10 to provide an air filter 1 and positioning the air filter so that the supported sorbent particles are exposed to air (the term air is used broadly and encompasses any gas or gaseous mixture, e.g. nitrogen, dehumidified nitrogen or air, oxygen-enriched air, air including an anesthetic gas or gas mixture, and so on). In many embodiments, the air to which the sorbent particles are exposed is in the form of a moving airstream. In some cases (which may be referred to as "active" filtration) such moving air may be motivated by a motorized blower, fan, and so on. In other cases (which may be referred to as "passive" filtration) such moving air may be motivated e.g. by the breathing of a person rather than by any motorized mechanism. The term "passive" filtration also encompasses situations in which an air filter 1 is exposed to currents, eddies, and the like, e.g. in an ambient atmosphere. Such currents and eddies might take the form of e.g. wind (such as might be impinged against an exterior surface of a filter support 10 that is provided in the form of e.g. a window screen). Or, in indoor environments, such currents and eddies might take the form of convection currents, random air currents, and the like, which regularly occur e.g. in rooms of buildings (due e.g. to doors opening and closing, persons moving, and so on). It will thus be appreciated that an air filter 1 as disclosed herein encompasses such devices as e.g. a cartridge, bag, pouch, canister, or, in general, any kind of container that holds sorbent particles 100 therein and that has at least one air-permeable wall so as to allow air to enter the container and contact the sorbent particles and to then exit the container, regardless of whether such a device is or is not used with any kind of mechanical blower or is used in any kind of respirator.

In broad summary, air filters 1 as described herein can find use in any suitable application in which it is desired to remove at least some basic, nitrogen-containing airborne substances from air. Such uses may involve personal devices (e.g. personal respiratory protection devices) designed for use by a single user, or collective devices (e.g. room air purifiers, HVAC systems, and so on) designed for e.g. buildings, vehicles, and other places where persons reside, work, or gather. As noted, such uses may involve "active" or "passive" filtration, and may use an air filter 1 that is configured in any of a wide variety of geometric formats and that is comprised of any of a wide variety of materials. Also as noted, one or more secondary sorbents may be used in addition to the herein-described polymeric sorbent particles 100, whether mixed with particles 100 and/or provided in a separate layer. As further noted, an air filter 1 may include at least one layer (in addition to the at least one support layer 10 that supports polymeric sorbent particles 100) that provides fine-particle filtration and/or that captures some gas/vapor other than basic, nitrogen-containing materials such as ammonia. Instead of this, or as an adjunct to this, a secondary air filter may be provided in addition to air filter 1, e.g. to perform filtration of fine particles and/or to capture some other gas/vapor. Moreover, combinations of any of the above-described embodiments of filter supports may be used. For example, polymeric sorbent particles 100 might be disposed within a fibrous web, or onto a surface of a netting, which web or netting might e.g. be placed within a housing to provide a filter cartridge.

Sorbent particles 100 are porous polymeric materials that comprise one or more divalent metals. The polymeric materials are divinyl-benzene/maleic anhydride polymers, partially hydrolyzed divinylbenzene/maleic anhydride polymers, or fully hydrolyzed divinylbenzene/maleic anhydride polymers. (The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.) It will be understood that such polymeric materials will be crosslinked materials (rather than e.g. linear polymers) due to the relatively high concentration of divinylbenzene among the monomer units. The divalent metal is selected from Group 2 or Group 6 to Group 12 of the IUPAC Periodic Table. The metal-containing polymeric materials can be used to capture basic, nitrogen-containing airborne materials having a molecular weight no greater than 150 grams/mole. This capture results in the formation of a metal complex-containing polymeric materials. The metal-containing polymeric materials often change color upon exposure to basic, nitrogen-containing compounds.

The term "divalent metal" refers to a metal having an oxidation state of +2. The divalent metal typically is from Group 2 or Groups 6 to 12 of the IUPAC Periodic Table of Elements. To avoid confusion, Group 2 has beryllium as its lightest member, Group 6 has chromium as its lightest member, Group 7 has manganese as its lightest member, Group 8 has iron as its lightest member, Group 9 has cobalt as its lightest member, Group 10 has nickel as its lightest member, Group 11 has copper as its lightest member, and Group 12 has zinc as its lightest member. The divalent metal can be in the form of a metal salt, a metal complex, a metal oxide, or the like.

The polymeric material is the reaction product of a polymerizable composition that includes a monomer mixture. The term "monomer mixture" refers to that portion of a polymerizable composition that includes the monomers. More specifically, the monomer mixture includes at least divinylbenzene and maleic anhydride. The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material that is formed.

The term "divinylbenzene/maleic anhydride polymeric material" refers to a polymeric material derived from divinylbenzene, maleic anhydride, and optionally a styrene-type monomer. The term "styrene-type monomer" refers to styrene, an alkyl substituted styrene (e.g., ethyl styrene), or mixtures thereof. (Such monomers are often present in divinylbenzene as impurities.) Typically, the divinylbenzene/maleic anhydride polymeric material contain 15 to 65 weight percent monomeric units derived from maleic anhydride and 35 to 85 weight percent monomeric units derived from divinylbenzene or a mixture of divinylbenzene and styrene-type monomers. The monomeric units derived from maleic anhydride can be monomeric units of Formula (I), Formula (II), or a mixture thereof. That is, these monomeric units can have an anhydride group as in Formula (I) or two carboxyl groups as in Formula (II) depending on the extent that the polymeric material has been hydrolyzed.

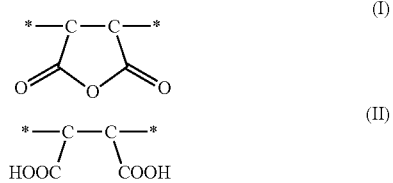

The monomeric units derived from divinylbenzene are of Formula (III) and those derived from styrene-type monomers are of Formula (IV):

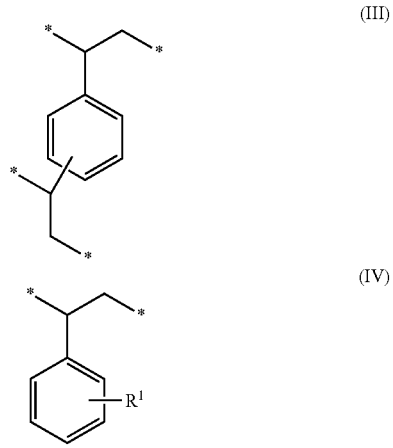

wherein $R_1$ is hydrogen or alkyl. Each asterisk (*) in Formulas (I) to (IV) indicates the attachment site to another monomeric unit or to a terminal group in the polymeric material.

The polymeric material can be considered to be non-hydrolyzed, partially hydrolyzed, or fully hydrolyzed depending on the form of the monomeric unit derived from maleic anhydride. The polymeric material can be referred to as being "non-hydrolyzed" if 90 to 100 weight percent of the monomeric units derived from maleic acid are of Formula (I) and 0 to less than 10 weight percent of the monomeric units derived from maleic anhydride are of Formula (II). The polymeric material can be referred to as being "partially hydrolyzed divinylbenzene/maleic anhydride polymeric material" if 10 to 90 weight percent of the monomeric units derived from maleic anhydride are of Formula (I) and 10 to 90 weight percent of the monomeric units derived from maleic anhydride are of Formula (II). The polymeric material can be referred to as being "fully hydrolyzed divinylbenzene/maleic anhydride polymeric material" if 0 to less than 10 weight percent of the monomeric units derived from maleic anhydride are of Formula (I) and greater than 90 to 100 percent of the monomeric units derived from maleic anhydride are of Formula (II). Frequently, however, a polymeric material that is non-hydrolyzed or partially hydrolyzed prior to incorporation of divalent metal undergoes some hydrolysis during incorporation of the divalent metal. That is, incorporation of the divalent metal, which is usually done in an aqueous solution, can result in some hydrolysis of the polymeric material having monomer units of Formula (I). Incorporation of the divalent metal can change a non-hydrolyzed divinylbenzene/maleic anhydride polymeric material to a partially hydrolyzed divinylbenzene/maleic anhydride polymeric material or can further hydrolyze a partially hydrolyzed divinylbenzene/maleic anhydride polymeric material.

The polymeric material is prepared from a polymerizable composition that includes a monomer mixture that includes at least divinylbenzene, maleic anhydride, and an optional styrene-type monomer. (The term "styrene-type monomer" refers to styrene, an alkyl substituted styrene (e.g., ethyl styrene), or mixtures thereof, which monomers are often present in divinylbenzene as impurities.) The resulting non-hydrolyzed divinylbenzene/maleic anhydride polymeric material can then be treated with divalent metal. Alternatively, all or any portion of the anhydride groups in the non-hydrolyzed divinylbenzene/maleic anhydride polymeric material can be treated with a hydrolyzing agent to prepare a partially hydrolyzed divinylbenzene/maleic anhydride polymeric material or fully hydrolyzed divinylbenzene/maleic anhydride polymeric material that is then treated with the divalent metal.

The polymeric material that is subsequently incorporated with divalent metal is typically porous. More specifically, the amount of divinylbenzene crosslinker, the amount of maleic anhydride, the amount of optional styrene-type monomer, and the organic solvent used to prepare the non-hydrolyzed polymeric material are carefully selected to prepare polymeric materials that are porous. Porous materials can be characterized based on the size of their pores. The term "micropores" refers to pores having a diameter of less than 2 nanometers. The term "mesopores" refers to pores having a diameter in a range of 2 to 50 nanometers. The term "macropores" refers to pores having a diameter greater than 50 nanometers. In particular, the polymeric materials, at least prior to incorporation of the divalent metal, usually have pores in the size range of micropores and/or mesopores.

The porosity of the polymeric material can be characterized from an adsorption isotherm of an inert gas such as nitrogen or argon by the porous material under cryogenic conditions. The adsorption isotherm is typically obtained by measuring adsorption of the inert gas by the porous material at multiple relative pressures in a range of about $10^{-6}$ to about 0.98. The isotherms are then analyzed using various methods to calculate specific surface areas (such as BET specific surface area) and total pore volume. The conditions used to synthesize the non-hydrolyzed divinylbenzene/maleic anhydride polymeric material are selected to produce a porous polymeric material that can, even after having a divalent metal impregnated therein, exhibit a BET specific surface area of at least 15 $m^2$/gram, at least 20 $m^2$/gram, at least 25 $m^2$/gram, or at least 50 $m^2$/gram.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (i.e., 77° K.) over a range of relative pressures. The term "BET specific surface area" is the surface area per gram of a material that is typically calculated from adsorption isotherm data of the inert gas over a relative pressure range of 0.05 to 0.3 using the BET method (Brunauer-Emmett-Teller Method).

The non-hydrolyzed divinylbenzene/maleic anhydride polymeric material is synthesized from a monomer mixture that includes at least maleic anhydride and divinylbenzene, and may include styrene-type monomer. Typically, the divinylbenzene/maleic anhydride polymeric material contain 15 to 65 weight percent monomeric units derived from maleic anhydride and 35 to 85 weight percent monomeric units derived from divinylbenzene or a mixture of divinylbenzene and styrene-type monomers. More particularly, the monomer mixture used to form the non-hydrolyzed divinylbenzene/maleic anhydride typically includes 1) 15 to 65 weight percent maleic anhydride, 2) 30 to 85 weight percent divinylbenzene, and 3) 0 to 40 weight percent (or 5 to 40 weight percent) of a styrene-type monomer, wherein the styrene-type monomer is styrene, an alkyl substituted styrene, or a combination thereof. The amount of each monomer is based on the total weight of monomers in the monomer mixture.

The amount of maleic anhydride used in the monomer mixture to prepare the non-hydrolyzed polymeric material effects the amount of divalent metal that can be incorporated into the polymeric material. If the amount of maleic anhydride is too low (e.g., below 15 weight percent of the monomers in the monomer mixture), the amount of divalent metal in the metal-containing polymeric material may be too low to effectively and efficiently capture basic, nitrogen-containing compounds of formula Q. On the other hand, if the amount of maleic anhydride is greater than 65 weight percent or 60 weight percent based on the total weight of monomers in the monomer mixture, the polymeric material may not have a sufficiently high BET specific surface area. If the BET specific surface area is too low, the polymeric material may not have sufficient porosity to incorporate a suitable amount of divalent metal.

In some embodiments, the amount of maleic anhydride in the monomer mixture is at least 15 weight percent, at least 20 weight percent, at least 25 weight percent, at least 30 weight percent, at least 35 weight percent, or at least 40 weight percent. The amount of maleic anhydride can be up to 65 weight percent, up to 62 weight percent, up to 61 weight percent, up to 60 weight percent, up to 55 weight percent, up 50 weight percent, up to 45 weight percent, or up to 40 weight percent. For example, the amount can be in a range of 15 to 65 weight percent, 15 to 60 weight percent, 20 to 60 weight percent, 25 to 60 weight percent, 30 to 60 weight percent, 35 to 60 weight percent, 40 to 60 weight percent, 15 to 55 weight percent, 15 to 50 weight percent, 15 to 45 weight percent, 20 to 50 weight percent, 20 to 45 weight percent, 25 to 50 weight percent, or 25 to 45 weight percent. The amounts are based on the total weight of monomers in the monomer mixture.

Stated differently, the polymeric material contains 15 to 65 weight percent monomeric units derived from maleic anhydride. The monomeric units derived from maleic anhydride are of Formula (I), Formula (II), or both. The relative amounts of Formula (I) and Formula (II) can vary depending on the degree of hydrolysis that has occurred. The amount of the monomeric units derived from maleic anhydride can be, for example, in a range of 15 to 60 weight percent, 20 to 60 weight percent, 25 to 60 weight percent, 30 to 60 weight percent, 35 to 60 weight percent, 40 to 60 weight percent, 15 to 55 weight percent, 15 to 50 weight percent, 15 to 45 weight percent, 20 to 50 weight percent, 20 to 45 weight percent, 25 to 50 weight percent, or 25 to 45 weight percent based on a total weight of the polymeric material.

The amount of divinylbenzene crosslinker can strongly influence the BET specific surface area of the divinylbenzene/maleic anhydride polymeric material whether it is non-hydrolyzed, partially hydrolyzed, or fully hydrolyzed. The divinylbenzene contributes to the high crosslink density and to the formation of a crosslinked, rigid polymeric material having micropores and/or mesopores. The BET specific surface area tends to increase with an increase in the amount of divinylbenzene in the monomer mixture. If the amount of divinylbenzene in the monomer mixture is less than 30 weight percent, the polymeric material may not have a sufficiently high BET specific surface area, particularly if the polymeric material is fully hydrolyzed. On the other hand, if the amount of divinylbenzene is greater than 85 weight percent, the anhydride and/or carboxylic acid content may be insufficient to incorporate the desired amount of the divalent metal.

In some embodiments, the amount of divinylbenzene is at least 30 weight percent, at least 35 weight percent, at least 40 weight percent, at least 45 weight percent, at least 50 weight percent, at least 55 weight percent, or at least 60 weight percent. The amount of divinylbenzene can be up to 85 weight percent, up to 80 weight percent, up to 75 weight percent, up to 70 weight percent, or up to 65 weight percent. For example, the divinylbenzene can be in a range of 30 to 85 weight percent, 30 to 80 weight percent, 30 to 75 weight percent, 30 to 70 weight percent, 30 to 60 weight percent, 30 to 55 weight percent, 30 to 50 weight percent, 40 to 80 weight percent, 50 to 80 weight percent, 40 to 75 weight percent, 50 to 75 weight percent, or 55 to 75 weight percent. The amounts are based on the total weight of monomers in the monomer mixture.

Stated differently, the polymeric material contains 30 to 85 weight percent of monomeric units derived from divinylbenzene. The amount of the monomeric unit derived from divinylbenzene can be, for example, in a range of 30 to 80 weight percent, 30 to 75 weight percent, 30 to 70 weight percent, 30 to 60 weight percent, 30 to 55 weight percent, 30 to 50 weight percent, 40 to 80 weight percent, 50 to 80 weight percent, 40 to 75 weight percent, 50 to 75 weight percent, or 55 to 75 weight percent. The amounts are based on the total weight of the polymeric material.

Divinylbenzene can be difficult to obtain in a pure form. For example, divinylbenzene is often commercially available with purity as low as 55 weight percent. Obtaining divinylbenzene with purity greater than about 80 weight percent can be expensive. The impurities accompanying divinylbenzene are typically styrene-type monomers such as styrene, alkyl substituted styrene (e.g., ethyl styrene), or mixtures thereof. Thus, styrene-type monomers are often present in the monomer mixture along with divinylbenzene and maleic anhydride. The monomer mixture typically contains 0 to 40 weight percent (or 5 to 40 weight percent) styrene-type monomers based on a total weight of monomers in the monomer mixture. If the content of the styrene-type monomer is greater than 40 weight percent, the crosslink density may be too low and/or the distance between crosslinks may be too large to provide a polymeric material with the desired BET specific surface area. This is particularly the situation if the polymeric material is fully hydrolyzed. As the crosslink density decreases, the resulting polymeric material tends to be less rigid and less porous.

In some embodiments, the amount of styrene-type monomers is at least 1 weight percent, at least 2 weight percent, at least 5 weight percent, or at least 10 weight percent. The amount of styrene-type monomer can be up to 40 weight percent, up to 35 weight percent, up to 30 weight percent, or up to 25 weight percent. For example, the amount of styrene-type monomer in the monomer mixture can be in a range of 0 to 40 weight percent, 1 to 40 weight percent, 5 to 40 weight percent, 1 to 30 weight percent, 5 to 30 weight percent, 1 to 20 weight percent, 5 to 20 weight percent, 5 to 15 weight percent, 10 to 40 weight percent, or 10 to 30 weight percent. The amounts are based on the total weight of monomers in the monomer mixture.

Stated differently, the polymeric material can contain 0 to 40 weight percent of monomeric units derived from styrene-type monomers. For example, the amount can be in a range of 1 to 40 weight percent, 5 to 40 weight percent, 1 to 30 weight percent, 5 to 30 weight percent, 1 to 20 weight percent, 5 to 20 weight percent, 5 to 15 weight percent, 10 to 40 weight percent, or 10 to 30 weight percent. The amounts are based on the total weight of the polymeric material.

Overall, the monomer mixture includes 15 to 65 weight percent maleic anhydride based on a total weight of monomers in the monomer mixture, 30 to 85 weight percent divinylbenzene based on the total weight of monomers in the monomer mixture, and 0 to 40 weight percent (or 5 to 40 weight percent) styrene-type monomer based on the total weight of monomers in the monomer mixture. In other embodiments, the monomer mixture contains 25 to 60 weight percent maleic anhydride, 30 to 75 weight percent divinylbenzene, and 1 to 30 weight percent styrene-type monomer. In other embodiments, the monomer mixture contains 30 to 60 weight percent maleic anhydride, 30 to 60 weight percent divinylbenzene, and 5 to 20 weight percent styrene-type monomer. In still other embodiments, the monomer mixture contains 40 to 60 weight percent maleic anhydride, 30 to 50 weight percent divinylbenzene, and 5 to 15 weight percent styrene-type monomer.

The monomer mixture typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, or at least 99.9 weight percent of the monomers in the monomer mixture are selected from maleic anhydride, divinylbenzene, and styrene-type monomer. In many embodiments, the only monomers purposefully added to the monomer mixture are maleic anhydride and divinylbenzene with any other monomers being present (including the styrene-type monomers) as impurities in the maleic anhydride and the divinylbenzene.

That is, the polymeric material typically contains 15 to 65 weight percent monomeric units derived from maleic anhydride, 30 to 85 weight percent monomeric units derived from divinylbenzene, and 0 to 40 weight percent (or 5 to 40 weight percent) monomeric units derived from styrene-type monomers. In other embodiments, the polymeric material contains 25 to 60 weight percent monomeric units derived from maleic anhydride, 30 to 75 weight percent monomeric units derived from divinylbenzene, and 1 to 30 weight percent (or 10 to 30 weight percent) monomeric units derived from styrene-type monomers. In other embodiments, the polymeric material contains 30 to 60 weight percent monomeric units derived from maleic anhydride, 30 to 65 weight percent monomeric units derived from divinylbenzene, and 5 to 20 weight percent (or 10 to 20 weight percent) monomeric units derived from styrene-type monomer. In still other embodiments, the polymeric material contains 40 to 60 weight percent monomeric units derived from maleic anhydride, 30 to 55 weight percent monomeric units derived from divinylbenzene, and 5 to 20 weight percent (or 10 to 20 weight percent) monomeric units derived from styrene-type monomers.

In addition to the monomer mixture, the polymerizable composition used to form the non-hydrolyzed divinylbenzene/maleic anhydride polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the polymeric material as it begins to form.

The organic solvent can function as a porogen as the divinylbenzene/maleic anhydride polymeric material is formed. The organic solvent choice can strongly influence the BET specific surface area and the size of the pores formed in the non-hydrolyzed polymeric material. Using organic solvents that are miscible with both the monomers and the forming polymer tend to result in the formation of polymeric material having micropores and mesopores. Good solvents for the monomers and the forming polymer tend to result in a larger fraction of the porosity of the final polymeric material being in the form of micropores and mesopores.

Organic solvents that can dissolve both the monomers and the forming polymeric material include, but are not limited to, ketones, esters, acetonitrile, and mixtures thereof. Other organic solvents can be added along with one or more of these organic solvents to provide that the resulting polymeric material (before any hydrolysis) exhibits a BET specific surface area of e.g. at least 100 $m^2$/gram. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 70 weight percent. If the percent solids are too low, the polymerization time may become undesirably long. The percent solids are often at least 1 weight percent, at least 2 weight percent, at least 5 weight percent, at least 10 weight percent, or at least 15 weight percent. If the percent solids are too great, however, the monomers do not form a single phase with the organic solvent. Further, increasing the percent solids tends to result in the formation of larger diameter pores and as a result the polymeric material tends to have a lower BET specific surface area. The percent solids can be up to 70 weight percent, up to 65 weight percent, up to 60 weight percent, up to 50 weight percent, up to 40 weight percent, up to 30 weight percent, or up to 25 weight percent. For example, the percent solids can be in a range of 5 to 70 weight percent, 5 to 60 weight percent, 10 to 60 weight percent, 20 to 60 weight percent, or 25 to 50 weight percent.

In addition to the monomer mixture and organic solvent, the polymerizable compositions typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature (defined herein as 20-25° C.). In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on a total weight of monomers in the polymerizable composition. Suitable thermal initiators include organic peroxides, azo compounds, and redox initiators. Potentially useful thermal initiators are listed and discussed in detail in International (PCT) Application No. PCT/US2016/030974 and in U.S. Provisional Patent Application No. 62/298,089, both of which are incorporated by reference herein.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a porous material. The presence of a surfactant could reduce the capacity of the metal-containing polymeric material to adsorb low molecular weight basic molecules.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a non-hydrolyzed polymeric material can be prepared that exhibits a BET specific surface area equal to at least 100 $m^2$/gram. In various embodiments, the BET specific surface area of the non-hydrolyzed polymer can be at least 150 m²/gram, at least 200 m²/gram, at least 250 m²/gram, or at least 300 m²/gram. The BET specific surface area can be, for example, up to 1000 m²/gram or higher, up to 900 m²/gram, up to 800 m²/gram, up to 750 m²/gram, or up to 700 m²/gram.

The high BET specific surface area is at least partially attributable to the presence of micropores and/or mesopores in the non-hydrolyzed divinylbenzene/maleic anhydride polymeric material. The argon adsorption isotherms of the non-hydrolyzed divinylbenzene/maleic anhydride polymeric materials indicate that there is considerable adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The non-hydrolyzed divinylbenzene/maleic anhydride polymeric material may be particular (e.g. granular) as formed and if desired can be used directly as the polymeric material used to incorporate a divalent metal forming the metal-containing polymeric material. Alternatively, the non-hydrolyzed polymeric material can be treated with a hydrolyzing agent to provide a partially or fully hydrolyzed divinylbenzene/maleic anhydride polymeric material. The hydrolyzing agent reacts with the maleic anhydride units resulting in the formation of two carboxylic acid groups (—COOH groups). Any suitable hydrolyzing agent can be used that can react with the anhydride group (—(CO)—O—(CO)—) of the maleic anhydride units. In many embodiments, the hydrolyzing agent is a base such as a basic material dissolved in water. One exemplary basic material is an alkali metal hydroxide such as sodium hydroxide (e.g., an aqueous solution of sodium hydroxide). Alternatively, the hydrolyzing agent could be water alone at elevated temperatures (e.g., above room temperature to boiling) or a dilute acid at slightly elevated temperatures (e.g., above room temperature to about 80° C.). In many embodiments, the preferred hydrolyzing agent is a base such as an alkali metal hydroxide. The non-hydrolyzed divinylbenzene/maleic anhydride polymeric material is mixed with a solution of alkali metal hydroxide dissolved in water or an alcohol such as methanol. The mixture is heated at a temperature near 80° C. for several hours (e.g., 4 to 12 hours). The hydrolyzed polymeric material can then be treated with hydrochloric acid to convert any carboxylate salts to carboxylic acid groups.

Stated in terms of the monomeric units present in the non-hydrolyzed, partially hydrolyzed, or fully hydrolyzed anhydride polymeric material, the polymeric material contains i) 15 to 65 weight percent of a first monomeric unit that is of Formula (I),

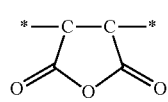

Formula (II),

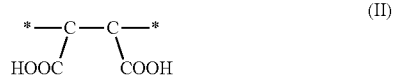

or a mixture thereof; ii) 30 to 85 weight percent of a second monomeric unit that is of Formula (III); and

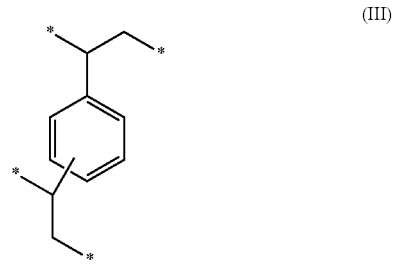

iii) 0 to 40 weight percent (or 5 to 40 weight percent) of a third monomeric unit that is of Formula (IV)

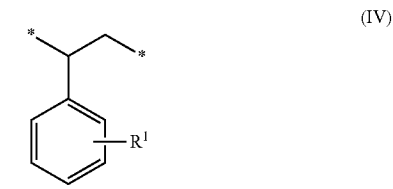

wherein $R^1$ is hydrogen or alkyl. Formula (I) corresponds to a non-hydrolyzed monomeric unit derived from maleic anhydride. This non-hydrolyzed monomeric unit contains an anhydride group (—(CO)—O—(CO)—). Formula (II) corresponds to a hydrolyzed monomeric unit derived from maleic anhydride. The hydrolyzed monomeric unit has two carboxylic acid groups (—(CO)OH) rather than an anhydride group. Formula (III) corresponds to a monomeric unit derived from divinylbenzene. The two alkylene groups attached to the aromatic ring can be in a meta- or para-position to each other. Formula (IV) is for a styrene-type monomeric unit. The group $R^1$ is hydrogen or an alkyl (e.g., an alkyl with 1 to 4 carbon atoms or 2 carbon atoms). In many embodiments $R^1$ is ethyl and the monomeric unit of Formula (IV) is derived from ethyl styrene, an impurity often present in divinylbenzene. The $R^1$ group is often in a meta- or para-position relative to the alkylene group attached to the aromatic ring. Each asterisk (*) in Formulas (I) to (IV) indicates the attachment site to another monomeric unit or to a terminal group in the polymeric material. The amounts of each of the first, second, and third monomeric units are the same as described above for the amounts of each monomer used to form the non-hydrolyzed divinylbenzene/maleic anhydride polymeric material.

If either partially or fully hydrolyzed, the polymeric material contains carboxylic acid groups. If the pH is sufficiently high, the polymeric material can be negatively charged. Typically, the polymeric material itself does not have any positively charged groups.

The hydrolyzed (e.g., fully hydrolyzed) divinylbenzene/maleic anhydride polymeric material has a BET specific surface area less than that of the non-hydrolyzed divinylbenzene/maleic anhydride polymeric material. The opening of the anhydride group may sufficiently increase the conformational freedom in the backbone resulting in decreased porosity. In addition, hydrogen bonding between carboxylic acids in the hydrolyzed material may possibly restrict or block access to pores. The BET specific surface area of the hydrolyzed polymeric material is often about 30 to 80 percent, 30 to 60 percent, 40 to 80 percent, or 40 to 60 percent of the BET specific surface area of the non-hydrolyzed polymeric material. Because of this decrease, it is often desirable to prepare a non-hydrolyzed divinylbenzene/maleic anhydride polymeric material having the highest possible BET specific surface area yet having sufficient maleic anhydride units to allow adequate incorporation of the divalent metal.

The hydrolyzed (e.g., fully hydrolyzed) divinylbenzene/maleic anhydride polymeric material typically exhibits a BET specific surface area equal to at least 50 $m^2$/gram, or at least 100 $m^2$/gram. In some embodiments, the BET specific surface area is at least 150 $m^2$/gram, at least 175 $m^2$/gram, at least 200 $m^2$/gram, at least 225 $m^2$/gram, at least 250 $m^2$/gram, or at least 300 $m^2$/gram. The BET specific surface area can be up to 600 $m^2$/gram or higher, up to 500 $m^2$/gram, or up to 400 $m^2$/gram. In some embodiments, the BET specific surface area is in a range of 50 to 600 $m^2$/gram, in a range of 75 to 600 $m^2$/gram, in a range of 100 to 600 $m^2$/gram, or in a range of 200 to 600 $m^2$/gram.

The argon adsorption isotherms of the hydrolyzed (e.g., fully hydrolyzed) divinylbenzene/maleic anhydride polymeric materials indicate that there is some adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent, or higher, or up to 75 percent or higher. In many embodiments, the BET specific surface area is attributable mainly to the presence of mesopores.

After formation of the polymeric material (i.e., non-hydrolyzed, partially hydrolyzed, or fully hydrolyzed divinylbenzene/maleic anhydride polymeric material), a divalent metal is incorporated into the polymeric material. The divalent metal is typically incorporated by treating the polymeric material with a solution of a metal salt dissolved in water. The metal salt contains a cation that is the divalent metal (i.e., a metal with a +2 oxidation state) and an anion. Suitable metal ions (divalent metals) are typically from Group 2 or Groups 6 to 12 of the periodic table. Example divalent metals include, but are not limited to, chromium, nickel, cobalt, copper, zinc, manganese, cadmium, iron, magnesium, calcium, barium, or a mixture thereof. In many embodiments, the divalent metal is a Group 6 to 12 metal such as, for example, chromium, nickel, cobalt, copper, zinc, iron, or a mixture thereof. In some particular embodiments, the divalent metal is copper, cobalt, zinc, or nickel. In some even more particular embodiments, the divalent metal is zinc or copper. It will be understood that by a divalent metal is meant at least one divalent metal; mixtures of any of the above divalent metals can thus be used.

The metal salts are typically selected from those that are soluble in water. The anion of the metal salt is often a halide (e.g., chloride), nitrate, sulfate, carboxylate (e.g., acetate, formate, and propanoate), or halogen-substituted carboxylates (e.g., chloroacetate, dichloroacetate, and chloro-substituted propanoate). In many embodiments, the anion is chloride, acetate, or nitrate.

Examples of specific metal salts include, but are not limited to, zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc propanoate, copper propanoate, nickel propanoate, cobalt propanoate, iron propanoate, manganese propanoate, cadmium propanoate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, chromium chloride, magnesium chloride, zinc sulfate, copper sulfate, nickel sulfate, cobalt sulfate, iron sulfate, manganese sulfate, cadmium sulfate, zinc nitrate, copper nitrate, nickel nitrate, cobalt nitrate, iron nitrate, and the like. Mixtures of any of these may be used if desired.

The divalent metal is typically incorporated by treating the polymeric material with a solution of the metal salt dissolved in water. The concentrations of the metal salt solutions are often in a range of 0.1 to 10 moles/liter. In some embodiments, the concentration is in a range of 0.5 to 10 moles/liter, in a range of 1 to 10 moles/liter, in a range of 1 to 8 moles/liter, in a range of 2 to 8 moles/liter, or in a range of 3 to 6 moles/liter. The resulting solution is mixed with the polymeric material. The amount of metal salt is typically added such that the moles of divalent metal are in excess compared to the moles of anhydride, carboxyl groups (~COOH groups), or both in the polymeric material.

The mixing time of the metal salt solution with the polymeric material is often up to 1 hour, up to 2 hours, up to 4 hours, up to 8 hours, up to 16 hours, up to 24 hours, or up to 48 hours. The mixing temperature can be at room temperature or above. The metal-containing polymeric material is then separated from the water and dried. Any suitable method of drying can be used. In some embodiments, the metal-containing polymeric material is dried under vacuum in an oven set at 80° C. to 120° C. The process of incorporation of the divalent metal into non-hydrolyzed polymeric material or partially hydrolyzed polymeric materials may result in some hydrolysis or further hydrolysis of at least a portion of the anhydride groups.

In some embodiments, the resulting metal-containing polymeric material contains at least 10 weight percent of the divalent metal based on a total weight of the polymeric material. The amount of the divalent metal can be at least 15 weight percent, at least 20 weight percent, at least 25 weight percent, at least 30 weight percent, at least 40 weight percent, or at least 50 weight percent based on a total weight of the polymeric material. The metal-containing polymeric material can include up to 100 weight percent or more of the divalent metal (i.e., the weight of the divalent metal can be equal to or exceed the weight of the polymeric material). For example, the amount can be up to 90 weight percent, up to 80 weight percent, up to 75 weight percent, up to 70 weight percent, up to 60 weight percent, or up to 50 weight percent based on the total weight of the polymeric material. For example, the amount is often in a range of 10 to 100 weight percent, 10 to 80 weight percent, 10 to 60 weight percent, 10 to 50 weight percent, 10 to 40 weight percent, 10 to 30 weight percent, 15 to 60 weight percent, 15 to 50 weight percent, 15 to 40 weigh percent, 15 to 30 weight percent, 20 to 60 weight percent, 20 to 50 weight percent, 20 to 40 weight percent or 20 to 30 weight percent.

In other embodiments or stated differently, the resulting metal-containing polymeric material contains at least 1.5 mmoles (millimoles) of the divalent metal per gram of the polymeric material. The amount of the divalent metal can be at least 2.0 mmoles, at least 2.25 mmoles, at least 3.0 mmoles, at least 3.75 mmoles, at least 4.0 mmoles, at least 4.5 mmoles, at least 5 mmoles, at least 6.0 mmoles, at least 7 mmoles, or at least 7.5 mmoles per gram of the polymeric material. The metal-containing polymeric material can include up to 15 mmoles or more of the divalent metal per gram. For example, the amount can be up to 14 mmoles, up to 13.5 mmoles, up to 13 mmoles, up to 12 mmoles, up to 11.25 mmoles, up to 11 mmoles, up to 10.5 mmoles, up to 10 mmoles, up to 9 mmoles, up to 8 mmoles, or up to 7.5 mmoles per gram of the polymeric material. For example, the amount is often in a range of 1.5 to 15 mmoles, 1.5 to 12 mmoles, 1.5 to 9 mmoles, 1.5 to 7.5 mmoles, 1.5 to 6 mmoles, 1.5 to 4.5 mmoles, 2.25 to 9 mmoles, 2.25 to 7.5 mmoles, 2.25 to 6 mmoles, 2.25 to 5 mmoles, 2.25 to 4.5 mmoles, 3.0 to 9 mmoles, 3.0 to 7.5 mmoles, 3.0 to 6 mmoles, or 3.0 to 4.5 mmoles per gram of the polymeric material.

In summary, the metal-containing polymeric material includes a) a polymeric material and b) a divalent metal incorporated into (i.e., sorbed on) the polymeric material in an amount equal to at least 10 weight percent based on the weight of the polymeric material (or at least 1.5 mmoles per gram of the polymeric material). The polymeric material contains i) 15 to 65 weight percent of a first monomeric unit that is of Formula (I),

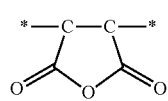

Formula (II),

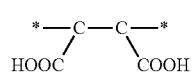

or a mixture thereof, ii) 30 to 85 weight percent of a second monomeric unit that is of Formula (III); and

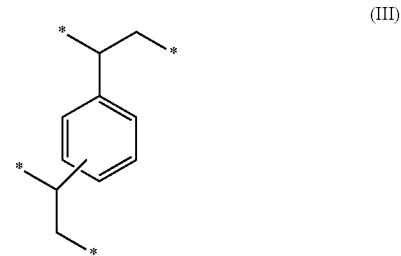

iii) 0 to 40 weight percent (or 5 to 40 weight percent) of a third monomeric unit that is of Formula (IV)

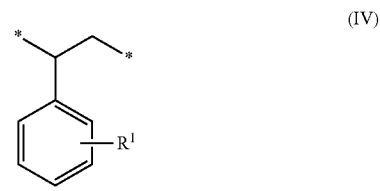

wherein $R^1$ is hydrogen or alkyl.

In some embodiments, the metal-containing polymeric material further includes an acid-base indicator. The acid-base colorimetric indicator (i.e., a dye (typically an organic dye) that changes color when it undergoes a transition from being in an acidic form to being in a basic form) is often added at the same time as the divalent metal. The acid-base colorimetric indicator is typically selected such that the basicity of the nitrogen-containing compound being sorbed is sufficient to shift the acid-base colorimetric indicator from its acidic form to its basic form.

A further consideration in the selection of the appropriate acid-base colorimetric indicator involves choosing an acid-base indicator that has a sufficiently lower affinity for the nitrogen-containing compound than the divalent metal such that the acid-base indicator does not change color until all or nearly all of the nitrogen-containing compound sorptive capacity of the divalent metal is exhausted. That is, the acid-base colorimetric indicator is selected to change from a first color to a second color when all or a significant portion of the available divalent metal atoms have had their sorptive capacity for nitrogen-containing compounds exhausted. The change in color then signals that the capacity of the polymeric sorbent for sorption of nitrogen-containing compounds has been reached or is close to being reached. As used herein, the term "close to being reached" means that at least 60 percent or more of the capacity has been reached (i.e., a least 60 percent or more of the available sorption sites have been used for sorption of a nitrogen-containing compound). For example, at least 70 percent, at least 80 percent, at least 90 percent, or at least 95 percent of the sorption sites have been used for sorption of a nitrogen-containing compound.

A final consideration in selecting an acid-base colorimetric indicator involves taking into account the color inherent to the metal-containing polymeric material. Some divalent metals when incorporated into the porous polymeric material impart the resulting metal-containing polymeric material with a color (i.e., $ZnCl_2$ metal-containing polymeric material is pink, CuCl$_2$ metal-containing polymeric material is dark gray/green and the NiCl$_2$ metal-containing polymeric material is tan). Selection of an acid-base colorimetric indicator whose color change from its acidic form to its basic form is obvious in light of the color change that may be inherent from the metal-containing polymeric material itself can be important. It can be advantageous to add an acid-base indicator even to metal-containing polymeric materials which inherently undergo a color change upon sorption of nitrogen-containing compounds in order to access a wider range of colors for the colorimetric indication, and in some cases, to mitigate the moisture sensitivity of the color shift of some metal-containing polymeric materials.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein. The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 1 to 10 milligrams per milliliter. Often, about 0.5 grams of the polymeric sorbent is soaked in about 10 milliliters of the solution.

Although the polymeric material can be non-hydrolyzed, partially hydrolyzed, or fully hydrolyzed, in some applications it may be preferable to use fully hydrolyzed polymeric material. The hydrolyzed polymeric material may perform more consistently than either the non-hydrolyzed or partially hydrolyzed polymeric materials because such materials may change with time (i.e., they have a tendency to undergo hydrolysis or further hydrolysis that may alter their performance characteristics).

In some embodiments such as with zinc-containing, cobalt-containing, nickel-containing, and magnesium-containing polymeric materials, the divalent metal may be present as an ionic species. For divalent metal that is ionic, a crystalline phase that includes the metal species usually cannot be detected when the metal-containing polymeric materials are analyzed using x-ray diffraction. In other embodiments such as with copper-containing polymeric materials, the divalent metal may be present as an oxide. For metal oxides, a crystalline phase may be detected when the metal-containing polymeric materials are analyzed using x-ray diffraction.

When analyzed using infrared spectroscopy, a shift in the carbonyl peak can be observed for the polymeric material after incorporation of the divalent metal. While not wanting to be bound by theory, it is believed that the divalent metal may be associated with (i.e., the metal may interact with or may coordinate with) the carboxyl groups or anhydride groups in the polymeric material.

Some of the metal-containing polymeric materials can be colored. Some colored examples include, but are not limited to, those containing zinc (II), copper (II), and nickel (II). Zinc containing-polymeric materials are often pink, copper-containing polymeric materials are often a dark grayish-green, and nickel-containing polymeric materials are often tan.

The metal-containing polymeric materials typically have a lower BET specific surface area than the corresponding polymeric material. The divalent metal resides in the pores of the polymeric material resulting in a decrease in the BET specific surface area. In many embodiments, the BET surface area of the porous polymeric material after divalent metal impregnation, may be at least 15 m$^2$/gram, at least 20 m$^2$/gram, at least 25 m$^2$/gram, at least 30 m$^2$/gram, at least 40 m$^2$/gram, or at least 50 m$^2$/gram.

After formation and drying and being deposited on any desired filter support by any suitable method, the metal-containing, porous polymeric material, provided in the form of sorbent particles supported by a filter support, can be used to capture airborne basic, nitrogen-containing compounds. Thus, a method of capturing basic, nitrogen-containing compounds from air is provided. The method includes providing the metal-containing polymeric material as described herein and then exposing the metal-containing polymeric material to air that potentially includes a basic, nitrogen-containing compound of formula Q e.g. in gaseous or vaporous form. A metal complex is formed. The metal complex includes the reaction product of the divalent metal as defined above and at least one compound of formula Q.

The basic nitrogen-containing compounds of formula Q that react with the divalent metal to form a metal complex can be classified as Lewis bases, Bronsted-Lowry bases, or both. Suitable basic nitrogen-containing compounds often have a low molecular weight (e.g., no greater than 150 grams/mole). That is, the basic, nitrogen-containing compounds can be volatile at or near room temperature or can be volatile under conditions of use. Examples of basic, nitrogen-containing compounds include, but are not limited to, ammonia, hydrazine compounds, amine compounds (e.g., alkyl amines, dialkylamines, triaalkylamines, alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

After exposure to gases or vapors of the basic, nitrogen-containing compound, the metal-containing polymeric material is converted to a metal complex-containing polymeric material. The metal complex-containing polymeric material includes a) a polymeric material and b) a metal complex incorporated into (i.e., sorbed on) the polymeric material. The polymeric material contains i) 15 to 65 weight percent of a first monomeric unit that is of Formula (I),

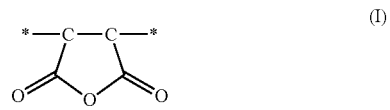 [SMILES: *C1C(=O)OC(=O)C1*]

Formula (II),

or a mixture thereof, ii) 30 to 85 weight percent of a second monomeric unit that is of Formula (III); and

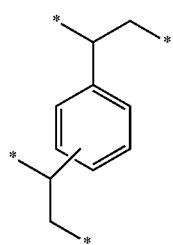
(III)

iii) 0 to 40 weight percent (or 5 to 40 weight percent) of a third monomeric unit that is of Formula (IV)

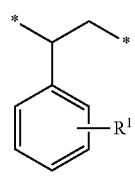
(IV)

wherein $R^1$ is hydrogen or alkyl. The metal complex includes a reaction product of a divalent metal and at least one basic, nitrogen-containing compound.

In many embodiments of the metal complex-containing polymeric material, divalent metal incorporated into the polymeric material remains that has not been converted to a metal complex. That is, the metal complex-containing polymeric material includes a mixture of divalent metal that is not complexed with the basic, nitrogen-containing compound and divalent metal that is complexed with at least one basic, nitrogen-containing compound.

The total amount of divalent metal (whether it is complexed or not with the basic, nitrogen-containing compound) is at least 10 weight percent based on a total weight of the polymeric material. The total amount of the divalent metal can be at least 20 weight percent, at least 25 weight percent, at least 30 weight percent, at least 40 weight percent, or at least 50 weight percent based on a total weight of the polymeric material. The amount can be up to 100 weight percent or more. For example, the amount can be up to 90 weight percent, up to 80 weight percent, up to 75 weight percent, up to 70 weight percent, up to 60 weight percent, or up to 50 weight percent based on the total weight of the polymeric material. For example, the amount is often in a range of 10 to 100 weight percent, 10 to 80 weight percent, 10 to 60 weight percent, 10 to 50 weight percent, 10 to 40 weight percent, 10 to 30 weight percent, 15 to 60 weight percent, 15 to 50 weight percent, 15 to 40 weigh percent, 15 to 30 weight percent, 20 to 60 weight percent, 20 to 50 weight percent, 20 to 40 weight percent or 20 to 30 weight percent.

Stated differently, the total amount of divalent metal (whether it is complexed or not with the basic, nitrogen-containing compound) is at least at least 1.5 mmoles (millimoles) per gram of the polymeric material. The total amount of the divalent metal can be at least 2.0 mmoles, at least 2.25 mmoles, at least 3.0 mmoles, at least 3.75 mmoles, at least 4.0 mmoles, at least 4.5 mmoles, at least 5 mmoles, at least 6.0 mmoles, at least 7 mmoles, or at least 7.5 mmoles per gram of the polymeric material. The metal-containing polymeric material can include up to 15 mmoles or more of the divalent metal per gram. For example, the amount can be up to 14 mmoles, up to 13.5 mmoles, up to 13 mmoles, up to 12 mmoles, up to 11.25 mmoles, up to 11 mmoles, up to 10.5 mmoles, up to 10 mmoles, up to 9 mmoles, up to 8 mmoles, or up to 7.5 mmoles per gram of the polymeric material. For example, the amount is often in a range of 1.5 to 15 mmoles, 1.5 to 12 mmoles, 1.5 to 9 mmoles, 1.5 to 7.5 mmoles, 1.5 to 6 mmoles, 1.5 to 4.5 mmoles, 2.25 to 9 mmoles, 2.25 to 7.5 mmoles, 2.25 to 6 mmoles, 2.25 to 5 mmoles, 2.25 to 4.5 mmoles, 3.0 to 9 mmoles, 3.0 to 7.5 mmoles, 3.0 to 6 mmoles, or 3.0 to 4.5 mmoles per gram of the polymeric material.

The maximum amount of basic, nitrogen-containing compounds sorbed (e.g., complexed) by the metal-containing polymeric material is related to the amount of divalent metal incorporated into the polymeric material. The maximum amount of basic, nitrogen-containing compound sorbed is often at least 0.5 milliequivalents per gram of metal-containing polymeric material (i.e., 0.5 milliequivalents of the sorbed basic, nitrogen-containing compound per gram of metal-containing polymeric material) and can be up to 10 milliequivalents per gram or even higher. In many embodiments, the maximum amount sorbed is at least 1 milliequivalents per gram, at least 2 milliequivalents per gram, or at least 3 milliequivalents per gram. The amount sorbed can be, for example, up to 9 milliequivalents per gram, up to 8 milliequivalents per gram, up to 7 milliequivalents per gram, up to 6 milliequivalents per gram, or up to 5 milliequivalents per gram.

Although the amount of divalent metal in the metal-containing polymeric material is an important factor for maximizing the capacity for sorption of basic, nitrogen-containing compounds, an upper amount of divalent metal is reached beyond which the capacity does not continue to increase. That is, beyond a certain point, incorporating more divalent metal into the metal-containing polymeric materials does not result in increased capacity for basic, nitrogen-containing compounds. If the amount of divalent metal incorporated is too large, the surface of the polymeric material may become saturated with the divalent metal and clustering and/or layering of the divalent metal may result. The clustering and/or layering may lead to a decreased amount of the divalent metal being available for coordination with (i.e., complexing with) the basic, nitrogen-containing compounds. Thus, the amount of divalent metal incorporated into the polymeric material can be optimized to obtain maximum sorption capacity for the basic, nitrogen-containing compounds.

The porosity of the polymeric material also affects the capacity of the metal-containing material for sorption of basic, nitrogen-containing compounds. Typically, polymeric materials with higher porosity have greater accessibility to functional group sites. Higher porosity polymeric materials, probably due to the presence of mesopores and/or micropores in the polymeric material, typically lead to higher incorporation of divalent metal. Higher incorporation of divalent metal (at least up the point where clustering and/or layering occurs) results in more coordination sites available for sorption of the basic, nitrogen-containing compounds. The porosity and BET specific surface area of the polymeric material can be altered by the amount of crosslinking (i.e., the amount of divinylbenzene) used to prepare the polymeric materials as well as the identity and amount of organic solvent present during formation of the polymeric materials.

In some embodiments, only a portion of the divalent metal in the metal-containing polymeric materials is complexed with the basic, nitrogen-containing compound of formula Q. That is, the maximum amount of Q is not sorbed. In this situation, the polymeric materials contain both a metal complex and divalent metal that is not complexed to the basic, nitrogen-containing compound.

Any method of capturing (i.e., sorbing) the basic, nitrogen-containing compound of formula Q on the metal-containing polymeric material can be used. In some embodiments, particularly if the divalent metal in the metal-containing polymeric material is selected from zinc, nickel, or copper, a color change occurs upon exposure to a basic, nitrogen-containing compound. For example, zinc-containing polymeric materials change from pink to tan, copper-containing polymeric materials change from dark grayish green to turquoise, and nickel-containing polymeric materials change from tan to olive green upon exposure to basic, nitrogen-containing compounds. This color change can be used to indicate exposure to the basic, nitrogen-containing compounds. The intensity of the color after exposure to the basic, nitrogen-containing compound may be related to the amount of exposure. It will be appreciated that even if such a color change might occur with a divalent metal provided on an activated carbon support upon being exposed to a basic compound, such a color change may not have been previously appreciated since the dark color of activated carbon will typically obscure any such subtle color change of a divalent metal incorporated therein.

Metal-containing porous materials, methods of making such materials, and methods of using such materials to capture basic, nitrogen-containing compounds are described in detail in International Application No. PCT/US2016/030974 and in U.S. Provisional Patent Application No. 62/298,089, both entitled Metal-Containing Polymeric Materials and both of which are incorporated by reference herein in their entirety. In some embodiments, sorbent particles that are supported on a filter support as disclosed herein may comprise a binder. Such approaches and arrangements are described in detail in U.S. Provisional Patent Application No. 62/421584, filed evendate herewith and entitled Composite Granules Including Metal-Containing Polymeric Materials, which is incorporated by reference herein in its entirety.

LIST OF EXEMPLARY EMBODIMENTS

Embodiment 1 is an air filter comprising a filter support that supports sorbent particles, wherein at least some of the sorbent particles are porous and comprise a polymeric material comprising: a) a polymer comprising i) 15 to 65 weight percent of a first monomeric unit that is of Formula (I), Formula (II), or a mixture thereof; ii) 30 to 85 weight percent of a second monomeric unit that is of Formula (III); and iii) 0 to 40 weight percent (or 5 to 40 weight percent) of a third monomeric unit that is of Formula (IV); wherein $R^1$ is hydrogen or alkyl; and b) a divalent metal incorporated into the polymeric material in an amount equal to at least 1.5 mmoles per gram of the polymeric material.

Embodiment 2 is the air filter of embodiment 1 wherein the filter support comprises a substrate with at least one major surface with at least some of the porous polymeric sorbent particles disposed thereon.

Embodiment 3 is the air filter of embodiment 2 wherein the porous polymeric sorbent particles are present substantially as a monolayer on the major surface of the substrate.

Embodiment 4 is the air filter of embodiment 1 wherein the filter support comprises a porous, air-permeable material with porous polymeric sorbent particles disposed on a major surface thereof and/or with porous polymeric sorbent particles disposed within the interior of the material at least in a location proximate the major surface of the material.

Embodiment 5 is the air filter of embodiment 4 wherein porous polymeric sorbent particles are disposed throughout the interior of the porous, air-permeable material.

Embodiment 6 is the air filter of any of embodiments 1-5 wherein the air filter consists essentially of the filter support.

Embodiment 7 is the air filter of any of embodiments 1-6 wherein the filter support comprises a sheet-like material that exhibits a major plane and that exhibits a thickness of less than about 3 mm and that is configured to allow airflow through the filter support at least in a direction at least generally perpendicular to the major plane of the sheet-like material.

Embodiment 8 is the air filter of any of embodiments 1-3 and 6-7 wherein the filter support comprises a netting with a major surface with at least some porous polymeric sorbent particles adhesively attached thereto.

Embodiment 9 is the air filter of any of embodiments 1-7 wherein the filter support comprises a fibrous web that exhibits an interior and wherein the porous polymeric sorbent particles are disposed within at least portions of the interior of the web.

Embodiment 10 is the air filter of embodiment 9 wherein the porous polymeric sorbent particles are disposed throughout an interior of the fibrous web.

Embodiment 11 is the air filter of any of embodiments 9-10 wherein the web is a nonwoven fibrous web.

Embodiment 12 is the air filter of embodiment 11 wherein the nonwoven fibrous web is a meltblown web.

Embodiment 13 is the air filter of any of embodiments 9-12 wherein at least some fibers of the fibrous web are each bonded to at least one porous polymeric sorbent particle.

Embodiment 14 is the air filter of any of embodiments 1-5 and 7-13 wherein the filter support is one layer of a multilayer, air-permeable assembly.

Embodiment 15 is the air filter of embodiment 14 wherein the multilayer air-permeable assembly includes at least one layer that is not the same layer as the filter support and that is a particle-filtration layer exhibiting a Percent Penetration of less than 50.

Embodiment 16 is the air filter of embodiment 15 wherein the particle-filtration layer comprises electret moities.

Embodiment 17 is the air filter of any of embodiments 1-14 wherein the filter support is a filter media that exhibits a Percent Penetration of less than 50.

Embodiment 18 is the air filter of any of embodiments 1-17 wherein the filter support is pleated.

Embodiment 19 is the air filter of any of embodiments 1-18 wherein the air filter is a framed air filter that is configured to be inserted into an air filter receptacle of an air-handling apparatus chosen from the group consisting of a forced air heating unit, a forced air cooling unit, a forced-air heating/cooling unit, a room air purifier, and a cabin air filtration unit for a motor vehicle.

Embodiment 20 is the air filter of any of embodiments 1, 6, and 14-16 wherein the filter support comprises a honeycomb with through-apertures within which sorbent particles are disposed.

Embodiment 21 is the air filter of any of embodiments 1-5 and 7-17 wherein the filter support provides a layer of a filtering face-piece respirator.

Embodiment 22 is the air filter of embodiment 21 wherein the filtering face-piece respirator is chosen from the group consisting of flat-fold respirators and molded respirators.

Embodiment 23 is the air filter of embodiment 1 wherein the filter support comprises a container with an interior within which porous polymeric sorbent particles are disposed, and with at least one air inlet and at least one air outlet.

Embodiment 24 is the air filter of embodiment 23 wherein the filter support comprises a filter cartridge.

Embodiment 25 is the air filter of embodiment 24 wherein the filter cartridge is configured to be used with a personal protection device chosen from the group consisting of half-face negative-pressure respirators, full-face negative-pressure respirators, escape hoods, and powered air-purifying respirators.

Embodiment 26 is the air filter of any of embodiments 1-25 wherein the porous sorbent particles are comprised of non-hydrolyzed polymeric material and exhibit a BET specific surface area of >100 m²/g, when measured in the absence of divalent metal.

Embodiment 27 is the air filter of any of embodiments 1-26 wherein the porous sorbent particles are comprised of hydrolyzed polymeric material and exhibit a BET specific surface area of >50 m²/g, when measured in the absence of divalent metal.

Embodiment 28 is the air filter of any of embodiments 1-27 wherein at least some of the porous sorbent particles are bound to neighboring porous sorbent particles by a binder.

Embodiment 29 is a method of capturing at least some of a basic, nitrogen-containing compounds having a molecular weight no greater than 150 grams/mole from air, the method comprising: positioning the air filter of any of embodiments 1-28 so that the porous polymeric sorbent particles are exposed to the air; and, sorbing at least some of the basic, nitrogen-containing compound onto the porous polymeric sorbent particles.

Embodiment 30 is the method of embodiment 29, wherein the filter support exhibits a major surface and wherein the air is present in the form of an airstream moving in a direction that is at least generally aligned with a plane of the major surface of the filter support.

Embodiment 31 is the method of embodiment 29, wherein the filter support allows airflow therethrough and wherein the air is present in the form of an airstream that passes through at least a portion the filter support in a direction at least generally perpendicular to a major surface of the filter support.

Embodiment 32 is a method of making an air filter comprising a filter support that comprises porous polymeric sorbent particles, the method comprising: providing porous polymeric sorbent particles that comprise a polymeric material comprising: a) a polymer comprising i) 15 to 65 weight percent of a first monomeric unit that is of Formula (I), Formula (II), or a mixture thereof, ii) 30 to 85 weight percent of a second monomeric unit that is of Formula (III); and iii) 0 to 40 weight percent (or 5 to 40 weight percent) of a third monomeric unit that is of Formula (IV); wherein $R^1$ is hydrogen or alkyl; and b) a divalent metal incorporated into the polymeric material in an amount equal to at least 1.5 mmoles per gram of the polymeric material; and, supporting the porous polymeric sorbent particles on a filter support.

Embodiment 33 is the air filter of any of embodiments 1-28, wherein the air filter further comprises at least one secondary sorbent.

Embodiment 34 is the air filter of embodiment 33, wherein the at least one secondary sorbent comprised activated carbon.

Embodiment 35 is the air filter of any of embodiments 1-28 and 33-34, the polymeric sorbent further comprising an acid-base dye.

In the above-listed Exemplary Embodiments, Formulas (I), (II), (III) and (IV) are stipulated to be the materials with structure as presented in the "Sorbent" portion of the Detailed Description.

EXAMPLES

List of Materials

| Chemical Name | Chemical Supplier |
|---|---|
| Aqueous boric acid solution (4 weight %) | Sigma-Aldrich, Milwaukee, WI |
| Bromocresol green | Sigma-Aldrich, Milwaukee, WI |
| Aqueous hydrogen chloride solution (0.1M) | Sigma-Aldrich, Milwaukee, WI |
| Divinylbenzene (DVB) (80% technical grade)* | Sigma-Aldrich, Milwaukee, WI |
| Maleic anhydride (MA) | Alfa Aesar, Ward Hill, MA |
| Benzoyl peroxide (BPO) | Sigma-Aldrich, Milwaukee, WI |
| Ethyl acetate (EtOAc) | EMD Millipore Chemicals, Billerica, MA |
| Sodium hydroxide (NaOH) | EMD Millipore Chemicals, Billerica, MA |
| Concentrated hydrogen chloride (HCl) | EMD Millipore Chemicals, Billerica, MA |
| Zinc (II) chloride ($ZnCl_2$), anhydrous, 99.99% | Alfa Aesar, Ward Hill, MA |

*Reported to contained 80 weight percent DVB and 20 weight percent styrene-type monomers. The calculation of moles of DVB used to prepare the polymeric material does take into account the purity.

Procedures
Analysis and Characterization Procedures

Porosity and gas sorption experiments, and calculation of parameters such as BET specific surface areas and pore volumes, were performed in similar manner as described in the "Gas Sorption Analysis" section of International Application No. PCT/US2016/030974 and U.S. Provisional Patent Application No. 62/298,089, both entitled METAL-CONTAINING POLYMERIC MATERIALS and both of which are incorporated by reference herein in their entirety. (These applications are referred to below as the PCT'974 application and the US'089 application, respectively.) All pore volumes reported in the Examples are measured at a relative pressure ($p/p^{\circ}$) of approximately 0.98 unless otherwise specified.

Ammonia Lifetime Cartridge Test

A simple flow-through custom-built delivery system was used to deliver known concentrations of ammonia to the sample for measurement. Stainless steel and poly(vinyl chloride) (PVC) tubing was used throughout the delivery system. Ammonia was delivered to the system from an anhydrous ammonia pressurized gas cylinder (Oxygen Service Company, St. Paul, Minn., USA). The ammonia stream was diluted with compressed air to deliver a 1000 ppm stream of ammonia at a flow of 25.2 or 32 L/minute (LPM) to the test chamber. The air flow rate was set using a 0-300 LPM TSI flowmeter (TSI, Shoreview, Minn.). The ammonia concentration was determined by a series of titrations. A 1 LPM flow of the challenge gas was pulled into a 15 mL impinger and bubbled through a 4% by weight aqueous boric acid solution. After about 15 minutes, the contents were poured into a beaker and a few drops of bromocresol green were added. 0.10 M hydrochloric acid was metered into the mixture until the mixture turned from blue to yellow.

The relative humidity (RH) of the ammonia test was maintained at a constant set point using a proportional integral derivative (PID) controller which detects the % RH of the system and heats a water bath to raise the humidity if it falls outside 0.2% of the desired % RH. The PID sensor was calibrated with a Vaisala HMM1014A1AE humidity probe (Vaisala, Vanta, Finland).

A cartridge was placed in a test chamber in line with the system allowing the 1000 ppm ammonia gas stream to flow through the cartridge. To the downstream side of the test chamber, tubing was connected that led to a photoacoustic gas detector Innova 1412 (California Analytical, Orange, Calif.). At the time the ammonia gas stream began to pass through the cartridge, the test was considered started, and a timer was started. The Innova photoacoustic gas detector sampled approximately every 50 seconds, and the system was flushed between samples.

Prior to testing, a certified 57 ppm ammonia in nitrogen pressurized gas cylinder (Oxygen Services Company, St. Paul, Minn., USA) was used to calibrate the photoacoustic gas detector. The signal generated by this effluent was used to set the software to 50 ppm ammonia. The end point of the ammonia vapor test was defined as the point corresponding to the time at which the ammonia effluent passing through the bed of test material produced a signal on the photoacoustic gas detector that exceeded the signal corresponding to 50 ppm. The performance of each cartridge was reported as the number of minutes until 50 ppm breakthrough was observed performing the test as described above.

Ammonia Lifetime Disposable Respirator Test

A simple flow-through custom-built delivery system was used to deliver known concentrations of ammonia to the disposable respirator for measurement. Stainless steel and PVC tubing was used throughout the delivery system. Ammonia was delivered to the system from an anhydrous ammonia pressurized gas cylinder (Oxygen Service Company, St. Paul, Minn., USA). The ammonia stream was diluted with compressed air to deliver a 56 ppm stream of ammonia at a flow of 30 LPM to the test chamber. The air flow rate was set using a 0-300 LPM TSI flowmeter (TSI, Shoreview, Minn.). The RH of the test was maintained at a constant 50% RH using a PID controller. The PID sensor was calibrated with a Vaisala HMM1014A1AE humidity probe (Vaisala, Vanta, Finland). The ammonia concentration was determined using a photoacoustic gas detector Innova 1412 (California Analytical, Orange, Calif.).

A respirator was placed in a test chamber in line with the system, allowing the 56 ppm ammonia gas stream to flow through the test material. To the downstream side of the test chamber, tubing was connected that led to the photoacoustic gas detector. At the time the ammonia gas stream began to pass through the disposable respirator, the test was considered started, and a timer was started. The Innova photoacoustic gas detector sampled approximately every 50 seconds, and the system was flushed between samples.

Prior to testing, a certified 57 ppm ammonia in nitrogen pressurized gas cylinder (Oxygen Services Company, St. Paul, Minn., USA) was used to calibrate the photoacoustic gas detector. The signal generated by this effluent was used to set the software to 50 ppm ammonia. The end point of the ammonia vapor test was defined as the point corresponding to the time at which the ammonia effluent passing through the bed of test material produced a signal on the photoacoustic gas detector that exceeded a signal corresponding to 5 ppm. The performance of each disposable respirator was reported as the number of minutes until 5 ppm breakthrough was observed performing the test as described above.

REPRESENTATIVE EXAMPLE

A batch of precursor polymeric material was made in generally similar manner as described in Example PE-15-1 of the above-referenced PCT'974 and US'089 applications. The precursor polymeric material had a $SA_{BET}$ in the range of approximately 240 m$^2$/gram and a total pore volume in the range of approximately 0.275 cm$^3$/gram (measured at a p/p$^\circ$ equal to 0.96). The precursor polymeric material was sieved to 12×40 mesh particles. The precursor polymeric material was reacted with a 4.0 M aqueous zinc (II) chloride ($ZnCl_2$) solution in generally similar manner as described in Example 15 of the PCT'974 application and the US'089 application. The $ZnCl_2$-containing porous polymeric sorbent had a $SA_{BET}$ in the range of approximately 35 m$^2$/gram and a total pore volume in the range of approximately 0.050 cm$^3$/gram.

Filter cartridges were obtained from 3M Company, St. Paul, Minn., of a type usable with the 3M HALF FACEPIECE REUSABLE RESPIRATOR 6000 SERIES. The cartridges were empty as obtained and comprised an empty interior volume of approximately 105 mL. The $ZnCl_2$-containing porous polymeric sorbent particles described above were manually deposited into the interior of the cartridge housing as a packed bed that occupied the 105 mL interior volume of the cartridge to the packing density allowed by the manual loading of the particles. The lid of the cartridge was then put in place with ultrasonic welding. By mass, this cartridge contained 59.3 grams of $ZnCl_2$-containing porous polymeric sorbent particles. This cartridge was used to perform an ammonia lifetime cartridge test as described above, at 15% RH and 32 LPM. The ammonia lifetime of the Representative Example cartridge was determined to be approximately 133 minutes.

Comparative Example (1)

An activated carbon was obtained and impregnated with $ZnCl_2$ in generally similar manner as described in Comparative Example 3 of the PCT'974 and US'089 applications, excepting that the activated carbon was of mesh size 12×40. An empty filter cartridge housing was obtained as described in the Representative Example and the 105 mL interior volume of the cartridge housing was filled with the $ZnCl_2$-impregnated activated carbon to form a packed bed. The lid of the cartridge was then put in place with ultrasonic welding. By mass, this cartridge contained 61.9 grams of $ZnCl_2$-containing activated carbon. This cartridge was used to perform an ammonia lifetime cartridge test as described above, at 15% RH and 32 LPM. The ammonia lifetime of the Comparative Example (1) cartridge was determined to be approximately 78 minutes.

VARIATION EXAMPLES

Variation Example (1)

A batch of $ZnCl_2$-containing porous polymeric sorbent particles was made and loaded into the interior volume of a filter cartridge housing in similar manner as in the Representative Example. The ammonia lifetime of the Variation Example (1) cartridge was tested in similar manner as for the Representative Example, except that the RH was approximately 0% rather than 15%. Under these conditions, the ammonia lifetime of the Variation Example (1) cartridge was determined to be approximately 178 minutes.

Variation Example (2)

An activated carbon of the type described in U.S. Pat. No. 6,767,860 to Hem as "URC" carbon was obtained and was not impregnated with $ZnCl_2$. The activated carbon was 12×30 mesh. Approximately 75 mL of this activated carbon was loaded into the (105 mL) interior volume of a filter cartridge housing of the type described above. A batch of $ZnCl_2$-containing porous polymeric sorbent particles was made in similar manner as in the Representative Example, excepting that the precursor polymer material was sieved to 40×80 mesh and the impregnation was done with a 6.0 M aqueous $ZnCl_2$ solution. The precursor material was not hydrolyzed, and exhibited a $SA_{BET}$ in the range of approximately 240 $m^2$/gram and a total pore volume in the range of approximately 0.275 $cm^3$/gram (measured at a $p/p^\circ$ equal to 0.96). Approximately 30 mL of the $ZnCl_2$-containing porous polymeric sorbent particles was loaded into the filter cartridge housing, as a layer atop the 75 mL layer of activated carbon. The lid of the cartridge was then put in place with ultrasonic welding. By mass, this cartridge contained 47.3 grams of activated carbon (as a layer occupying approximately 75 mL) and 18.2 grams of the $ZnCl_2$-containing polymeric sorbent (as a layer occupying approximately 25 mL). This cartridge was used to perform an ammonia lifetime cartridge test as described above, at 15% RH and 32 LPM. The ammonia lifetime of the Variation Example (2) cartridge was determined to be approximately 39 minutes.

Variation Example (3)

An activated carbon of the general type described above in Variation Example (2) was obtained and was not impregnated with $ZnCl_2$. The activated carbon was 12×30 mesh. Approximately 75 mL of the activated carbon was loaded into the (105 mL) interior volume of a filter cartridge housing of the type described above. A batch of porous polymeric sorbent particles was made in similar manner as in Variation Example (2). This precursor material exhibited a $SA_{BET}$ in the range of approximately 240 $m^2$/gram and a total pore volume in the range of approximately 0.275 $cm^3$/gram (measured at a $p/p^\circ$ equal to 0.96). This precursor material was hydrolyzed in generally similar manner as described in Example PE-10-2 of the PCT'974 and US'089 applications. The hydrolyzed, porous polymeric material exhibited a $SA_{BET}$ in the range of approximately 110 $m^2$/gram and a total pore volume in the range of approximately 0.135 $cm^3$/gram. The hydrolyzed, porous polymeric material was then impregnated with $ZnCl_2$ in generally similar manner as in Variation Example (2). The $ZnCl_2$-containing, hydrolyzed, porous polymeric sorbent had a $SA_{BET}$ in the range of approximately 35 $m^2$/gram and a total pore volume in the range of approximately 0.050 $cm^3$/gram.

Approximately 30 mL of the $ZnCl_2$-containing, hydrolyzed, porous polymeric sorbent particles was loaded into a filter cartridge housing, as a layer atop a 75 mL layer of activated carbon as in Variation Example (2). The lid of the cartridge was then put in place with ultrasonic welding. By mass, this cartridge contained 47.3 grams of activated carbon and 17.6 grams of the $ZnCl_2$-containing hydrolyzed polymeric sorbent. This cartridge was used to perform an ammonia lifetime cartridge test as described above, at 15% RH and 32 LPM. The ammonia lifetime of the Variation Example (3) cartridge was determined to be 34 minutes.

Variation Example (4)

A batch of precursor polymeric material was made in generally similar manner as described in Example PE-7-1 of the above-referenced PCT'974 and US'089 applications. The precursor polymeric material had a $SA_{BET}$ in the range of approximately 290 $m^2$/gram and a total pore volume in the range of approximately 0.240 $cm^3$/gram. The precursor polymeric material was sieved to 40×80 mesh particles.

This precursor material was hydrolyzed in generally similar manner as described in Example PE-7-2 of the PCT'974 and US'089 applications. The hydrolyzed, porous polymeric material exhibited a $SA_{BET}$ in the range of approximately 110 $m^2$/gram and a total pore volume in the range of approximately 0.135 $cm^3$/gram. The hydrolyzed, porous polymeric material was then impregnated with $ZnCl_2$ in generally similar manner as in Example 7 of the PCT'974 and US'089 applications. The $ZnCl_2$-containing, hydrolyzed, porous polymeric sorbent had a $SA_{BET}$ in the range of approximately 35 $m^2$/gram and a total pore volume in the range of approximately 0.050 $cm^3$/gram.

A netting was obtained from Delstar Technologies (Middleton, Del.) under the trade designation DELNET. The netting comprised two sets of filaments oriented substantially perpendicular to each other to form an array of generally rectangular through-apertures (openings) each with an approximate dimension of 0.2×1.1 mm. A pressure-sensitive adhesive (PSA) precursor (coating solution) comprised primarily of an acrylic latex (Novacryl PSP-180; Omnova Solutions, Beachwood, Ohio) and a tackifier (Aquatac 6085; Arizona Chemicals, Jacksonville, Fla.) was applied to both sides of the netting, and the liquid was removed via evaporation to leave a PSA on each side of the netting. Particles of the $ZnCl_2$-containing polymeric sorbent described above were manually sprinkled onto both sides of the netting so that sorbent particles were adhesively attached to the PSA on the major surfaces of the netting.

Pieces of this sorbent-loaded netting were cut to the same size as the inner dimensions of a filter cartridge housing that was similar to the above-described filter cartridge housing excepting with an interior volume of 75 mL rather than 105 mL. Two pieces of the sorbent-loaded netting were loaded into the interior of the cartridge. The remaining portion of the interior volume of the cartridge was filled with a 12×30 mesh activated carbon of the general type described in Variation Example 2 (and that had not been impregnated with $ZnCl_2$). The lid of the cartridge was then put in place with ultrasonic welding. The mass of the $ZnCl_2$-containing polymeric sorbent within the cartridge was calculated (based on the loading on the netting and the area of netting used) to be approximately 2.71 grams. This cartridge was used to perform an ammonia lifetime cartridge test as described above at 5% RH and 25.2 LPM. The ammonia lifetime of the cartridge was determined to be 31 minutes.

Comparative Example (4)

An activated carbon was obtained and impregnated with $ZnCl_2$ in generally similar manner as described above for Comparative Example (1), excepting that the activated carbon was of mesh size 20×40. The $ZnCl_2$-loaded activated carbon was manually deposited onto a netting and adhered thereto with a PSA, in similar manner as described in Variation Example (4). Two layers of the netting were loaded into a filter cartridge housing, and the remaining volume of the filter cartridge housing was filled with activated carbon (that had not been loaded with $ZnCl_2$) in similar manner as in Variation Example (4). The lid of the cartridge was then put in place with ultrasonic welding. The mass of the $ZnCl_2$-containing activated carbon within the cartridge was calculated (based on the loading on the netting and the area of netting used) to be approximately 3.35 grams. This cartridge was used to perform an ammonia lifetime cartridge test as described above at 5% RH and 25.2 LPM. The ammonia lifetime of the cartridge was determined to be 22 minutes.

Variation Example (5)

A batch of precursor polymeric material was made in generally similar manner as described above in the Representative Example. The precursor polymeric material had a $SA_{BET}$ in the range of approximately 240 m²/gram and a total pore volume in the range of approximately 0.275 cm³/gram (measured at a p/p° equal to 0.96). The precursor polymeric material was sieved to 20×40 mesh particles. The precursor polymer material was impregnated with $ZnCl_2$ in similar manner as in Example 15 of the PCT'974 and US'089 applications. The $ZnCl_2$-containing porous polymeric sorbent had a $SA_{BET}$ in the range of approximately 35 m²/gram and a total pore volume in the range of approximately 0.050 cm³/gram.

A meltblown polypropylene nonwoven web was obtained with a basis weight of approximately 70 g/m². An acrylic based pressure-sensitive adhesive (Acronal A 220; BASF, Ludwigshafen, Germany) was screen printed onto one major surface of the meltblown polypropylene nonwoven web. Particles of the $ZnCl_2$-containing polymeric sorbent were manually sprinkled onto the adhesive-bearing major surface of the nonwoven web so that sorbent particles were adhesively attached to the major surface of the web by way of the PSA. This sorbent-loaded nonwoven web was then incorporated (via ultrasonic welding) into a prototype flat-fold disposable respirator mask. By mass, the disposable respirator mask contained approximately 4.69 grams of $ZnCl_2$-containing porous polymeric sorbent. The respirator (in an unfolded configuration) was used to perform an ammonia lifetime disposable respirator test as described above. The ammonia lifetime of the disposable respirator was determined to be approximately 211 minutes.

Comparative Example (5)

An activated carbon was obtained and impregnated with $ZnCl_2$ in generally similar manner as described above for Comparative Example (1). The $ZnCl_2$-loaded activated carbon particles were manually deposited onto a major surface of a meltblown nonwoven web and adhered thereto with a PSA, in similar manner as described for the porous polymeric sorbent particles in Variation Example (5). The nonwoven web was incorporated into a prototype flat-fold disposable respirator mask in similar manner as in Variation Example (5). The respirator was then used to perform an ammonia lifetime disposable respirator test as described above at 5% RH and 25.2 LPM. The ammonia lifetime of the disposable respirator was determined to be approximately 112 minutes.

This application incorporates by reference International Application No. PCT/US2016/030974 and U.S. Provisional Patent Application No. 62/298,089. Those applications contain working examples in which porous polymeric sorbents were made and impregnated with a variety of divalent metals (e.g. zinc, copper, nickel, and magnesium), using a variety of counterions (e.g. chloride, acetate and nitrate). Although those examples are not reproduced in the present application for reasons of brevity, the performance of those examples as described in the PCT'974 and US'089 applications would lead an ordinary artisan to expect that the properties (in particular the enhanced ability to sorb basic, nitrogen-containing compounds such as ammonia) displayed by those Working Example sorbents would be similarly exhibited were these sorbents to be disposed on a suitable filter support in the manner disclosed in the present application.

Many of the Working Examples have included results presented in terms of the "ammonia lifetime" achieved by various formulations and configurations. It will be appreciated that the use of a parameter such as an "ammonia lifetime" is purely for convenience in characterizing an enhanced ability to sorb basic, nitrogen-containing compounds; a relatively low value of such a parameter does not necessarily imply that a particular formulation or configuration cannot exhibit satisfactory filtration performance (e.g. in terms of passing any applicable government standards). It will also be appreciated that the achievement of a relatively long ammonia lifetime may indicate that with a particular formulation or configuration, a reduced amount of sorbent and/or a reduced amount of metal impregnated thereinto may be able to be used while still meeting all applicable performance standards.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. A method of capturing at least some of at least one basic, nitrogen-containing compound having a molecular weight no greater than 150 grams/mole from air, the method comprising:
   providing an air filter comprising a filter support that supports sorbent particles, wherein at least some of the sorbent particles are porous and comprise a polymeric material comprising:
   a) a polymer comprising
      i) 15 to 65 weight percent of a first monomeric unit that is of Formula (I), Formula (II), or a mixture thereof;

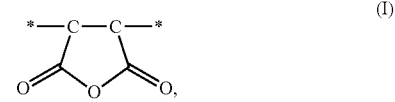 [SMILES: *C1C(=O)OC(=O)C1*]

-continued

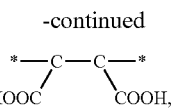
(II)

ii) 30 to 85 weight percent of a second monomeric unit that is of Formula (III); and

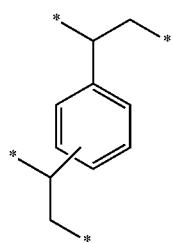
(III)

iii) 0 to 40 weight percent of a third monomeric unit that is of Formula (IV)

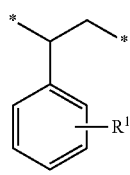
(IV)

wherein $R^1$ is hydrogen or alkyl; and
b) a divalent metal incorporated into the polymeric material in an amount equal to at least 1.5 mmoles per gram of the polymeric material,
positioning the air filter so that the porous polymeric sorbent particles are exposed to the air;
and,
sorbing at least some of the at least one basic, nitrogen-containing compound having a molecular weight no greater than 150 grams/mole onto onto the porous polymeric sorbent particles.

2. The method of claim 1, wherein the filter support exhibits a major surface and wherein the air is present in the form of an airstream moving in a direction that is at least generally aligned with a plane of the major surface of the filter support.

3. The method of claim 1 wherein the filter support allows airflow therethrough and wherein the air is present in the form of an airstream that passes through at least a portion the filter support in a direction at least generally perpendicular to a major surface of the filter support.

4. The method of claim 1 wherein the filter support comprises a substrate with at least one major surface with at least some of the porous polymeric sorbent particles disposed thereon.

5. The method of claim 4 wherein the porous polymeric sorbent particles are present substantially as a monolayer on the major surface of the substrate.

6. The method of claim 1 wherein the filter support comprises a porous, air-permeable material with porous polymeric sorbent particles disposed on a major surface thereof and/or with porous polymeric sorbent particles disposed within the interior of the material at least in a location proximate the major surface of the material.

7. The method of claim 6 wherein porous polymeric sorbent particles are disposed throughout the interior of the porous, air-permeable material.

8. The method of claim 1 wherein the air filter consists essentially of the filter support with the polymeric sorbent particles supported thereon.

9. The method of claim 1 wherein the filter support exhibits a major plane and exhibits a thickness of less than 3 mm and is configured to allow airflow through the filter support at least in a direction at least generally perpendicular to the major plane of the filter support.

10. The method of claim 1 wherein the filter support comprises a netting with a major surface with at least some porous polymeric sorbent particles adhesively attached thereto.

11. The method of claim 1 wherein the filter support comprises a fibrous web that exhibits an interior and wherein the porous polymeric sorbent particles are disposed within at least portions of the interior of the web.

12. The method of claim 11 wherein the porous polymeric sorbent particles are disposed throughout an interior of the fibrous web.

13. The method of claim 11 wherein the web is a nonwoven fibrous web.

14. The method of claim 13 wherein the nonwoven fibrous web is a meltblown web.

15. The method of claim 11 wherein at least some fibers of the fibrous web are each bonded to at least one porous polymeric sorbent particle.

16. The method of claim 1 wherein the filter support is one layer of a multilayer, air-permeable assembly.

17. The method of claim 16 wherein the multilayer air-permeable assembly includes at least one layer that is not the same layer as the filter support and that comprises electret moieties.

18. The method of claim 1 wherein the filter support is pleated.

19. The method of claim 1 wherein the air filter is a framed air filter that is installed in an air filter receptacle of an air-handling apparatus chosen from the group consisting of a forced air heating unit, a forced air cooling unit, a forced-air heating/cooling unit, a room air purifier, and a cabin air filtration unit for a motor vehicle.

20. The method of claim 1 wherein the filter support comprises a honeycomb with through-apertures within which sorbent particles are disposed.

21. The method of claim 1 wherein the filter support provides a layer of a filtering face-piece respirator chosen from the group consisting of flat-fold respirators and molded respirators.

22. The method of claim 1 wherein the filter support comprises a container with an interior within which porous polymeric sorbent particles are disposed, and with at least one air inlet and at least one air outlet.

23. The method of claim 22 wherein the filter support comprises a filter cartridge installed in a personal protection device chosen from the group consisting of half-face negative-pressure respirators, full-face negative-pressure respirators, escape hoods, and powered air-purifying respirators.

* * * * *

UNITED STATES PATENT AND TRADEMARK OFFICE
CERTIFICATE OF CORRECTION

Page 1 of 2

PATENT NO. : 11,103,822 B2
APPLICATION NO. : 16/349673
DATED : August 31, 2021
INVENTOR(S) : Michael S. Wendland It is certified that error appears in the above-identified patent and that said Letters Patent is hereby corrected as shown below:

In the Claims

Column 43
Line 40, in Claim 1, delete "," after "and".
Line 43, in Claim 1, delete "onto onto", and insert -- onto --, therefor.
Line 52, in Claim 3, insert --of-- after "portion".
Line 55, in Claim 4, insert --,-- before "wherein".
Line 59, in Claim 5, insert --,-- before "wherein".
Line 62, in Claim 6, insert --,-- before "wherein".

Column 44
Line 4, in Claim 7, insert --,-- before "wherein".
Line 4, in Claim 7, insert --the-- before "porous polymeric".
Line 7, in Claim 8, insert --,-- before "wherein".
Line 10, in Claim 9, insert --,-- before "wherein".
Line 15, in Claim 10, insert --,-- before "wherein".
Line 19, in Claim 11, insert --,-- before "wherein".
Line 23, in Claim 12, insert --,-- before "wherein".
Line 26, in Claim 13, insert --,-- before "wherein".
Line 28, in Claim 14, insert --,-- before "wherein".
Line 30, in Claim 15, insert --,-- before "wherein".
Line 33, in Claim 16, insert --,-- before "wherein".
Line 35, in Claim 17, insert --,-- before "wherein".
Line 39, in Claim 18, insert --,-- before "wherein".
Line 41, in Claim 19, insert --,-- before "wherein".
Line 45, in Claim 19, delete "forced-air heating/cooling" and insert --forced air heating/cooling--, therefor.
Line 47, in Claim 20, insert --,-- before "wherein".
Line 50, in Claim 21, insert --,-- before "wherein".

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*

Line 54, in Claim 22, insert --,-- before "wherein".
Line 58, in Claim 23, insert --,-- before "wherein".